United States Patent
Kim et al.

(10) Patent No.: US 10,509,616 B2
(45) Date of Patent: Dec. 17, 2019

(54) METHOD FOR OPERATING ELECTRONIC DEVICE, AND ELECTRONIC DEVICE

(71) Applicant: Samsung Electronics Co., Ltd., Gyeonggi-do (KR)

(72) Inventors: Heang-Su Kim, Incheon (KR); Nan-Sook Kim, Yongin-si (KR); Ha-Young Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 15/195,662

(22) Filed: Jun. 28, 2016

(65) Prior Publication Data

US 2017/0017454 A1    Jan. 19, 2017

(30) Foreign Application Priority Data

Jul. 14, 2015  (KR) .......................... 10-2015-0099923

(51) Int. Cl.
*G06F 3/0484* (2013.01)
*G06F 3/0482* (2013.01)
(Continued)

(52) U.S. Cl.
CPC .......... *G06F 3/1454* (2013.01); *G06F 3/0486* (2013.01); *G06F 3/04842* (2013.01); *G06F 3/04845* (2013.01); *H04L 67/06* (2013.01); *H04M 1/7253* (2013.01); *H04N 21/4126* (2013.01); *H04N 21/42208* (2013.01); *H04N 21/431* (2013.01); *H04M 2250/64* (2013.01)

(58) Field of Classification Search
CPC ................................ G06F 3/067; G06F 3/0486
See application file for complete search history.

(56) References Cited

U.S. PATENT DOCUMENTS

| 2009/0030971 | A1* | 1/2009 | Trivedi | G06F 3/0486 |
| | | | | 709/203 |
| 2011/0197147 | A1* | 8/2011 | Fai | G06F 1/1639 |
| | | | | 715/753 |

(Continued)

FOREIGN PATENT DOCUMENTS

| KR | 10-1436536 | 9/2014 |
| KR | 10-2014-0122000 | 10/2014 |
| KR | 10-2015-0015697 | 2/2015 |

OTHER PUBLICATIONS

The International Searching Authority, "International Search Report," International Application No. PCT/KR2016/007604, dated Oct. 5, 2016, 3 pages, publisher International Application Division, Korean Intellectual Property Office, Daejeon, Republic of Korea.

(Continued)

*Primary Examiner* — Rayeez R Chowdhury

(57) ABSTRACT

A method for operating a first electronic device is provided. The method includes displaying a first graphic element and a first screen part related to a second electronic device on a first display of the first electronic device and detecting movement of the first graphic element in relation to the first screen part. The method also includes displaying a second screen part related to the second electronic device in response to the movement where a second graphic element corresponding to the first graphic element is inserted in the second screen part.

20 Claims, 26 Drawing Sheets

(51) Int. Cl.
*G06F 3/14* (2006.01)
*G06F 3/0486* (2013.01)
*H04N 21/41* (2011.01)
*H04N 21/422* (2011.01)
*H04N 21/431* (2011.01)
*H04L 29/08* (2006.01)
*H04M 1/725* (2006.01)

(56) References Cited

U.S. PATENT DOCUMENTS

| | | | | |
|---|---|---|---|---|
| 2011/0283334 A1* | 11/2011 | Choi | ............... | G06F 3/04883 |
| | | | | 725/148 |
| 2012/0005578 A1* | 1/2012 | Hawkins | ............... | G06F 3/0488 |
| | | | | 715/702 |
| 2012/0038541 A1* | 2/2012 | Song | ............... | G06F 3/1423 |
| | | | | 345/1.1 |
| 2012/0144347 A1* | 6/2012 | Jo | ............... | G06F 3/04883 |
| | | | | 715/863 |
| 2013/0326397 A1 | 12/2013 | Kim et al. | | |
| 2014/0009394 A1* | 1/2014 | Lee | ............... | H04N 5/4403 |
| | | | | 345/157 |
| 2014/0016037 A1* | 1/2014 | Goldberg | ............... | G06F 9/452 |
| | | | | 348/600 |
| 2014/0181686 A1 | 6/2014 | Shin et al. | | |
| 2014/0244738 A1* | 8/2014 | Rydenhag | ............... | G06F 9/4856 |
| | | | | 709/204 |
| 2014/0320387 A1* | 10/2014 | Eriksson | ............... | G06F 3/017 |
| | | | | 345/156 |
| 2015/0020013 A1 | 1/2015 | Kim et al. | | |
| 2015/0054852 A1 | 2/2015 | Ohnuma et al. | | |
| 2015/0067590 A1 | 3/2015 | Lee et al. | | |

OTHER PUBLICATIONS

The International Searching Authority, "Written Opinion of The International Searching Authority," International Application No. PCT/KR2016/007604, dated Oct. 5, 2016, 5 pages, publisher International Application Division, Korean Intellectual Property Office, Daejeon, Republic of Korea.

European Patent Office, "European Search Report," Application No. 16179247.8-1959, dated Nov. 29, 2016, 7 pages, publisher EPO, Munich, Germany, place of search The Hague.

* cited by examiner

METHOD FOR OPERATING ELECTRONIC DEVICE, AND ELECTRONIC DEVICE

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Jul. 14, 2015 and assigned Serial No. 10-2015-0099923, the entire disclosure of which is incorporated herein by reference.

TECHNICAL FIELD

The present disclosure relates to an electronic device and a method for operating the electronic device.

BACKGROUND

A portable phone is capable of outputting a video displayed on a screen, such as a broadcasting program, to an external device. Its user may view images on a larger screen by outputting image data downloaded from a Web server or captured through a camera to the external device.

Also, a portable phone equipped with a mirroring function is capable of outputting a screen to an external device as it is. Its user may view the screen (that is, a mirrored screen) of the portable phone on a screen of the external device and control the portable phone remotely by applying an input to the mirrored screen using an input device of the external device.

Although conventionally, a screen of a portable phone may be displayed on an external device or the portable phone may be controlled remotely, the conventional mirroring method has limitations in easily reflecting data of the external device in a task (or application) of the portable phone.

Accordingly, there exists a need for a method for easily reflecting data of an external device in a task (or application) of a portable phone by mirroring.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide, for use in an electronic device, a method for easily reflecting data of an external device in a task (or application) of a portable phone by mirroring.

In accordance with an aspect of the present disclosure, there is provided a method for operating a first electronic device. The method includes displaying a first graphic element and a first screen part related to a second electronic device on a first display of the first electronic device, detecting movement of the first graphic element in relation to the first screen part, and displaying a second screen part related to the second electronic device in response to the movement, a second graphic element corresponding to the first graphic element being inserted in the second screen part.

In accordance with another aspect of the present disclosure, there is provided a first electronic device. The first electronic device includes a first display, and a processor configured to display a first graphic element and a first screen part related to a second electronic device on the first display, detect movement of the first graphic element in relation to the first screen part, and display a second screen part related to the second electronic device in response to the movement, a second graphic element corresponding to the first graphic element being inserted in the second screen part.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
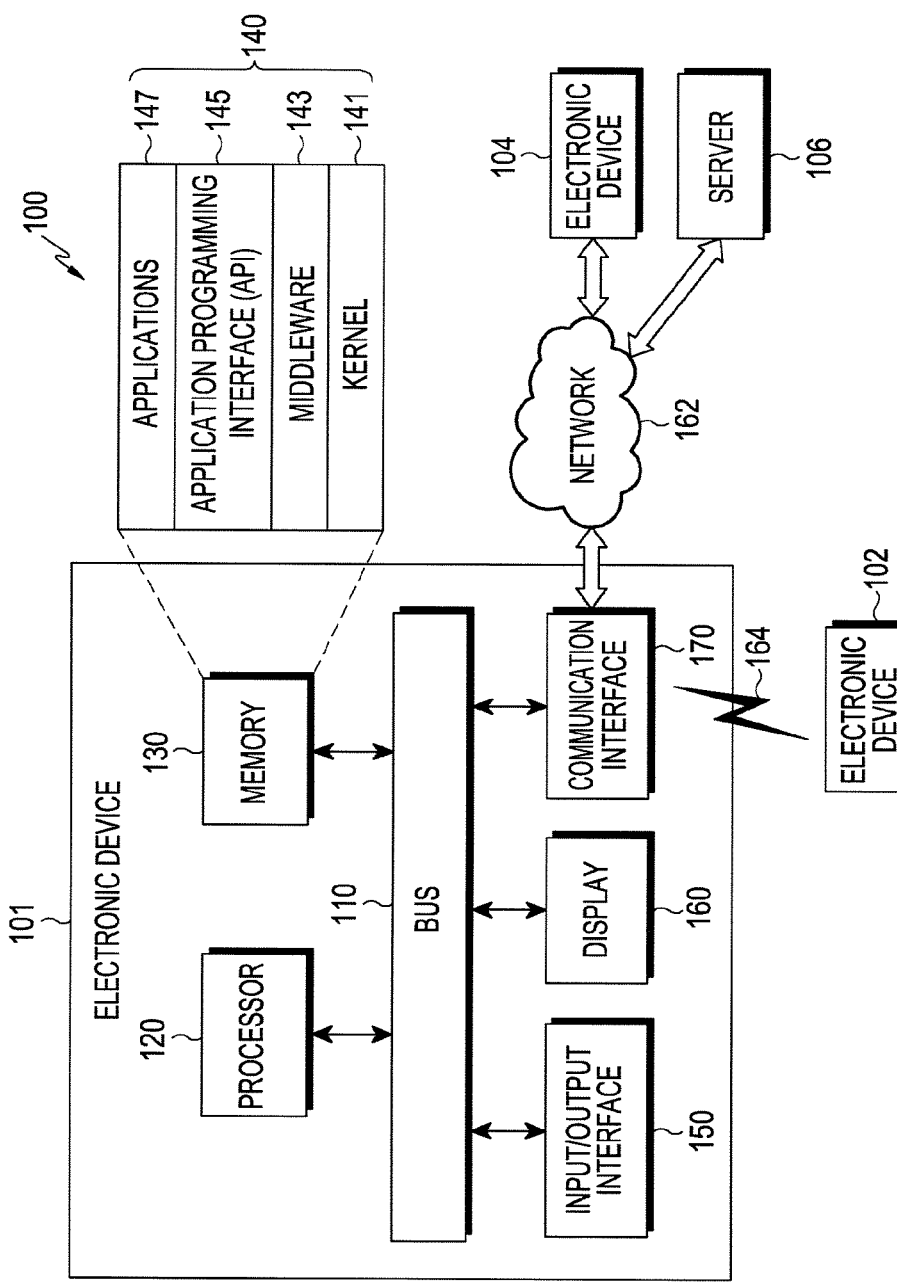
FIG. 1 illustrates an electronic device in a network environment according to various embodiments.

FIGS. 1 through 13B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

In the present disclosure, the term 'have', 'may have', 'include', or 'may include' signifies the presence of a specific feature (for example, number, function, operation, or component such as part), not excluding the presence of one or more other features.

In present disclosure, the term 'A or B', 'at least one of A or/and B', 'A/B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

The terms as used in the present disclosure are provided to describe merely specific embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

An electronic device according to various embodiments of the present disclosure may be at least one of, for example, a smartphone, a tablet personal computer (PC), a mobile phone, a video phone, an e-Book reader, a desktop PC, a laptop PC, a netbook computer, a workstation, a server, a personal digital assistant (PDA), a portable multimedia player (PMP), an MP3 player, a mobile medical equipment, a camera, or a wearable device. According to various embodiments, the wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), a body-attached type (for example, a skin pad or a tattoo), or an implantable type (for example, an implantable circuit).

According to some embodiments, an electronic device may be a home appliance. For example, the home appliance may be at least one of, for example, a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV®, Google TV®, or the like), a game console (for example, Xbox®, PlayStation®, or the like), an electronic dictionary, an electronic key, a camcorder, or an electronic picture frame.

According to other embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler).

According to some embodiments, an electronic device may be at least one of furniture, part of a building/structure, an electronic board, an electronic signature receiving device, a projector, or various measuring devices (for example, water, electricity, gas or electro-magnetic wave measuring devices). According to various embodiments, an electronic device may be one or a combination of two or more of the foregoing devices. According to some embodiments, an electronic device may be a flexible electronic device. In addition, it will be apparent to one having ordinary skill in the art that an electronic device according to an embodiment of the present disclosure is not limited to the foregoing devices and covers a new electronic device produced along with technology development.

With reference to the attached drawings, an electronic device according to various embodiments will be described below. In the present disclosure, the term 'user' may refer to a person or device (for example, artificial intelligence electronic device) that uses an electronic device.

Referring to FIG. 1, an electronic device 101 in a network environment 100 according to various embodiments is described. The electronic device 101 may include a bus 110, a processor 120, a memory 130, an input/output (I/O) interface 150, a display 160, and a communication interface 170. In some embodiments, at least one of the components may be omitted in the electronic device 101 or a component may be added to the electronic device 101.

The bus 110 may include a circuit that interconnects, for example, the foregoing components 120, 130, 150, 160, and 170 and allows communication (for example, control messages and/or data) between the foregoing components.

The processor 120 may include one or more of a CPU, an AP, or a communication processor (CP). The processor 120 may, for example, execute computation or data processing related to control and/or communication of at least one other component of the electronic device 101. The processor 120 may be referred to as a controller, the processor 120 may include the controller as its part, or the processor 120 may form the controller.

The memory 130 may include a volatile memory and/or a non-volatile memory. The memory 130 may, for example, store instructions or data related to at least one other component. According to an embodiment, the memory 130 may store software and/or programs 140. The programs 140 may include, for example, a kernel 141, middleware 143, an application programming interface (API) 145, and/or application programs (or applications) 147. At least a part of the kernel 141, the middleware 143, and the API 145 may be called an operating system (OS).

The kernel 141 may control or manage system resources (for example, the bus 110, the processor 120, or the memory 130) that are used in executing operations or functions implemented in other programs such as the middleware 143, the API 145, or the application programs 147. Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data.

Also, the middleware 143 may process one or more task requests received from the application programs 147 according to their priority levels. For example, the middleware 143 may assign priority levels for using system resources (the bus 110, the processor 120, or the memory 130) of the electronic device 101 to at least one of the application programs 147. For example, the middleware 143 may perform scheduling or load balancing for the one or more task requests by processing the one or more task requests according to the priority levels assigned to the at least one application program 147.

The API 145 is an interface that may control functions that the application programs 147 provide at the kernel 141 or the middleware 143. For example, the API 145 may include at least one interface or function (for example, a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (for example, text, an image, a video, an icon, or a symbol) to the user. The display 160 may include a touch screen and receive, for example, a touch input, a gesture input, a proximity input, or a hovering input through an electronic pen or a user's body part.

The communication interface 170 may establish communication, for example, between the electronic device 101 and an external device (for example, a first external electronic device 102, a second external electronic device 104, or a server 106). For example, the communication interface 170 may be connected to a network 162 by wireless communication or wired communication and communicate with the external device (for example, the second external electronic device 104 or the server 106) over the network 162. The communication interface 170 may include a CP, and the CP may be one of a plurality of modules in the communication interface 170. In an embodiment, the CP may be incorporated in the processor 120.

The wireless communication may be conducted using, for example, at least one of long tend evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol. The wireless communication may include, for example, short-range communication 164. The short-range communication 164 may be conducted by, for example, at least one of WiFi®, Bluetooth®, near field communication (NFC), or GNSS. GNSS may include, for example, at least one of global positioning system (GPS), global navigation satellite system (GLONASS), BeiDou navigation satellite system (hereinafter, referred to as 'BeiDou'), or Galileo (the European global satellite-based navigation system), according to a region using the GNSS or a used bandwidth. In the present disclosure, the terms ' GPS' and 'GNSS' are interchangeably used with each other. The wired communication may be conducted in conformance to, for example, at least one of universal serial bus (USB), high definition multimedia interface (HDMI), recommended standard 232 (RS-232), or plain old telephone service (POTS). The network 162 may be a telecommunication network, for example, at least one of a computer network (for example, local area network (LAN) or wide area network (WAN)), the Internet, or a telephone network.

Each of the first and second external electronic devices 102 and 104 may be of the same type as or a different type from the electronic device 101. According to an embodiment, the server 106 may include a group of one or more servers. According to various embodiments, all or a part of operations performed in the electronic device 101 may be performed in one or more other electronic devices (for example, the electronic devices 102 and 104) or the server 106. According to an embodiment, if the electronic device 101 is to perform a function or a service automatically or upon request, the electronic device 101 may request at least a part of functions related to the function or the service to another device (for example, the electronic device 102 or 104 or the server 106), instead of performing the function or the service autonomously, or additionally. The other electronic device (for example, the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
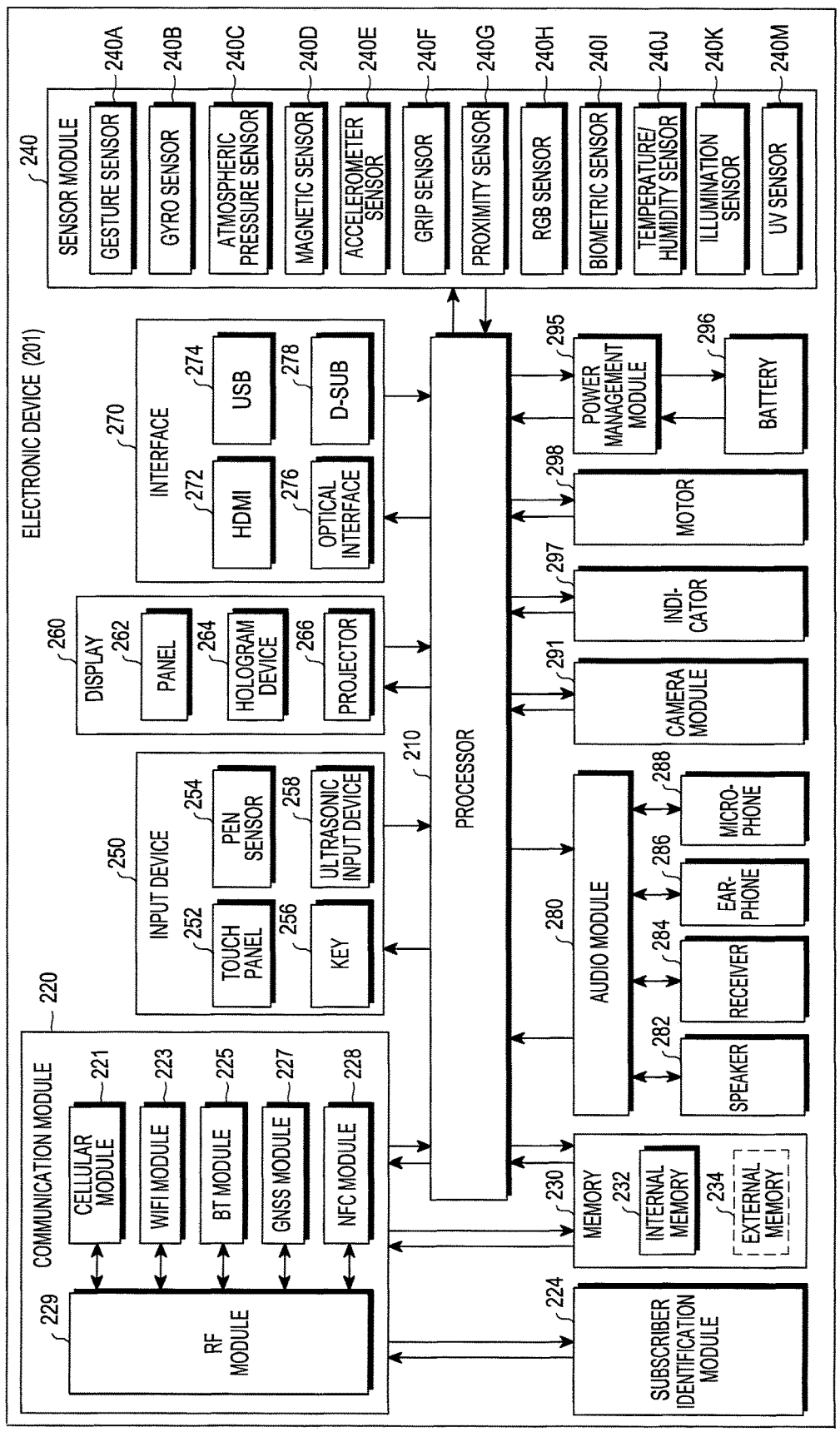
FIG. 2 illustrates an electronic device according to various embodiments.

FIG. 2 illustrates an electronic device 201 according to various embodiments. The electronic device 201 may include, for example, the whole or part of the electronic device 101 illustrated in FIG. 1. The electronic device 201 may include at least one processor (for example, AP) 210, a communication module 220, a memory 230, a sensor module 240, an input device 250, and a display 260. The electronic device 201 may further include at least one of a subscriber identification module (SIM) 224, an interface 270, an audio module 280, a camera module 291, a power management module 295, a battery 296, an indicator 297, and a motor 298.

The processor 210 may, for example, control a plurality of hardware or software components that are connected to the processor 210 by executing an OS or an application program and may perform processing or computation of various types of data. The processor 210 may be implemented, for example, as a system on chip (SoC). According to an embodiment, the processor 210 may further include a graphics processing unit (GPU) and/or an image signal processor. The processor 210 may include at least a part (for example, a cellular module 221) of the components illustrated in FIG. 2. The processor 210 may load a command or data received from at least one of other components (for example, a non-volatile memory), process the loaded command or data, and store various types of data in the non-volatile memory.

The communication module 220 may have the same configuration as or a similar configuration to the communication interface 170 illustrated in FIG. 1. The communication module 220 may include at least one of, for example, the cellular module 221, a WiFi® module 223, a Bluetooth® (BT) module 225, a GNSS module 227 (for example, a GPS module, a GLONASS module, a BeiDou module, or a Galileo module), an NFC module 228, and a radio frequency (RF) module 229.

The cellular module 221 may provide services such as voice call, video call, text service, or the Internet service, for example, through a communication network. According to an embodiment, the cellular module 221 may identify and authenticate the electronic device 201 within a communication network, using the SIM (for example, a SIM card) 224. According to an embodiment, the cellular module 221 may perform at least a part of the functionalities of the processor 210. According to an embodiment, the cellular module 221 may include a CP.

Each of the WiFi® module 223, the BT module 225, the GNSS module 227, and the NFC module 228 may include, for example, a processor that may process data received or transmitted by the module. According to an embodiment, at least a part (for example, two or more) of the cellular module 221, the WiFi® module 223, the BT module 225, the GNSS module 227, or the NFC module 228 may be included in a single integrated chip (IC) or IC package.

The RF module 229 may transmit and receive, for example, communication signals (for example, RF signals). The RF module 229 may include at least one of, for example, a transceiver, a power amplifier module (PAM), a frequency filter, a low noise amplifier (LNA), an antenna, or the like. According to another embodiment, at least one of the cellular module 221, the WiFi® module 223, the BT module 225, the GNSS module 227, or the NFC module 228 may transmit and receive RF signals via a separate RF module.

The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

The memory 230 (for example, the memory 130) may include, for example, an internal memory 232 and/or an external memory 234. The internal memory 232 may be at least one of, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state driver (SSD).

The external memory 234 may further include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, or an ultra violet (UV) sensor 240M. Additionally or alternatively, the sensor module 240 may include, for example, an electrical-nose (E-nose) sensor, an electromyogram (EMG) sensor, an electroencephalogram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252. The input device 250 may further include at least one of a (digital) pen sensor 254, a key 256, or an ultrasonic input device 258. The touch panel 252 may operate in at least one of, for example, capacitive, resistive, infrared, and ultrasonic schemes. The touch panel 252 may further include a control circuit. The touch panel 252 may further include a tactile layer to thereby provide haptic feedback to the user.

The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (for example, a microphone 288), and identify data corresponding to the sensed ultrasonic signals.

The display 260 (for example, the display 160) may include a panel 262. The display 260 may further include a hologram device 264 and/or a projector 266. The panel 262 may have the same configuration as or a similar configuration to the display 160 illustrated in FIG. 1. The panel 262 may be configured to be, for example, flexible, transparent, or wearable. The panel 262 and the touch panel 252 may be implemented as a single module. The hologram device 264 may utilize the interference of light waves to provide a three-dimensional image in empty space. The projector 266 may display an image by projecting light on a screen. The screen may be positioned, for example, inside or outside the electronic device 201. According to an embodiment, the display 260 may further include a control circuit for controlling the panel 262, the hologram device 264, or the projector 266.

The interface 270 may include at least one of, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD/multimedia card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment, the camera module 291 may include one or more image sensors (for example, a front sensor or a rear sensor), a lens, an image signal processor (ISP), or a flash (for example, an LED or a xenon lamp).

The power management module 295 may manage power of, for example, the electronic device 201. According to an embodiment, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (for example, the processor 210), for example, boot status, message status, or charge status. The motor 298 may convert an electrical signal into a mechanical vibration and generate vibrations or a haptic effect. While not shown, the electronic device 201 may include a processing device for supporting mobile TV (for example, a GPU). The processing device for supporting mobile TV may process media data compliant with, for example, digital multimedia broadcasting (DMB), digital video broadcasting (DVB), or MediaFLO™.

Each of the above-described components of the electronic device may include one or more parts and the name of the component may vary with the type of the electronic device. According to various embodiments, the electronic device may be configured to include at least one of the afore-described components. Some component may be omitted from or added to the electronic device. According to various embodiments, one entity may be configured by combining a part of the components of the electronic device, to thereby perform the same functions of the components prior to the combining.

Figure 3:
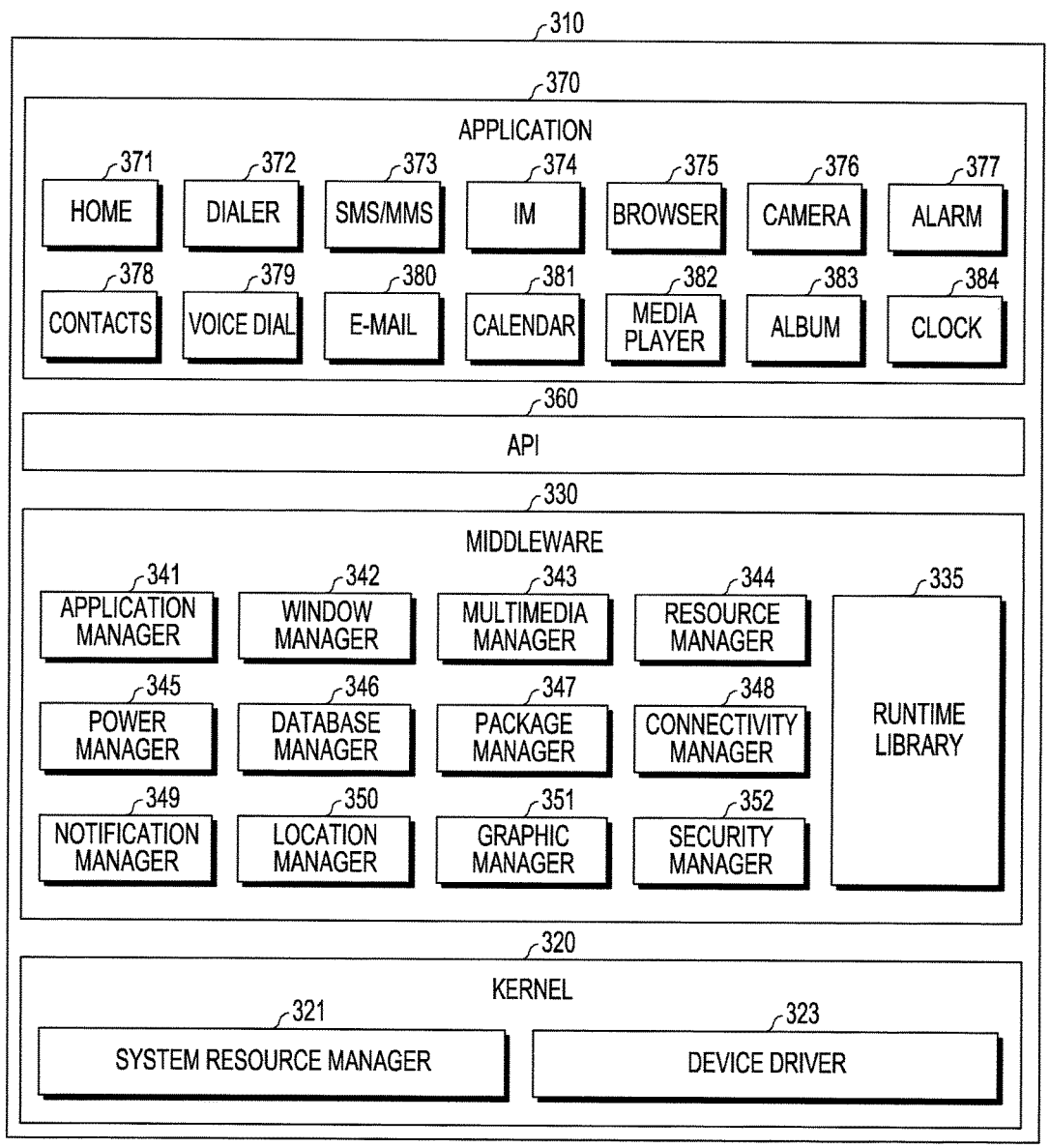
FIG. 3 illustrates a programming module according to various embodiments.

FIG. 3 illustrates a programming module according to various embodiments of the present disclosure. According to an embodiment, a programming module 310 (for example, a program 140) may include an OS that controls resources related to an electronic device (for example, the electronic device 101) and/or various applications executed on the OS (for example, the application programs 147). For example, the OS may be Android®, iOS, Windows®, Symbian®, Tizen®, Samsung Bada®, or the like.

The programming module 310 may include a kernel 320, middleware 330, an Application Programming Interface (API) 360, and/or applications 370. At least a part of the programming module 310 may be preloaded on the electronic device or downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or deallocate system resources. According to an embodiment, the system resource manager 321 may include at least one of a process manager, a memory manager, or a file system manager. The device driver 323 may include, for example, a display driver, a camera driver, a Bluetooth® driver, a shared memory driver, a USB driver, a keypad driver, a WiFi® driver, an audio driver, or an inter-process communication (IPC) driver.

The middleware 330 may, for example, provide a function required commonly for the applications 370 or provide various functionalities to the applications 370 through the API 360 so that the applications 370 may efficiently use limited system resources available within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, a function related to arithmetic function, or the like.

The application manager 341 may manage, for example, the life cycle of at least one of the applications 370. The window manager 342 may manage GUI resources used for a screen. The multimedia manager 343 may determine formats required to play back various media files and may encode or decode a media file using a CODEC suitable for the format of the media file. The resource manager 344 may manage resources such as a source code of at least one of the applications 370, a memory, or storage space.

The power manager 345 may, for example, manage a battery or a power source by operating in conjunction with a basic input/output system (BIOS) and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity of WiFi®, Bluetooth®, or the like. The notification manager 349 may indicate or notify an event such as message arrival, a schedule, a proximity alarm, or the like in a manner that does not bother a user. The location manager 350 may mange position information about the electronic device. The graphic manager 351 may manage graphical effects to be provided to the user or related user interfaces. The security manager 352 may provide an overall security function required for system security, user authentication, or the like. In an embodiment, if the electronic device (for example, the electronic device 101) has a telephony function, the middleware 330 may further include a telephony manager to manage a voice or video call function of the electronic device.

A new middleware module may be created and used by combining various functions of the above-described component modules in the middleware 330. The middleware 330 may provide a customized module for each OS type in order to provide differentiated functions. In addition, the middleware 330 may dynamically delete a part of the existing components or add a new component.

The API 360 (for example, the API 145) is, for example, a set of API programming functions, which may be configured differently according to an OS. For example, in the case of Android or iOS, one API set may be provided per platform, whereas in the case of Tizen, two or more API sets may be provided per platform.

The applications 370 (for example, the application programs 147) may include, for example, one or more applications capable of providing functions such as home 371, dialer 372, short message service/multimedia messaging service (SMS/MMS) 373, Instant message (IM) 374, browser 375, camera 376, alarm 377, contacts 378, voice dial 379, email 380, calendar 381, media player 382, album 383, or clock 384, health care (for example, measurement of an exercise amount or a glucose level), or providing of environment information (for example, information about atmospheric pressure, humidity, or temperature).

According to an embodiment, the applications 370 may include an application (for the convenience of description, referred to as 'information exchange application') supporting information exchange between the electronic device (for example, the electronic device 101) and an external electronic device (the electronic device 102 or 104). The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device (for example, the electronic device 102 or 104). Also, the notification relay application may, for example, receive notification information from the external electronic device and transmit the received notification information to a user.

The device management application may, for example, manage (for example, install, delete, or update) at least a part of functions of the external electronic device (for example, the electronic device 102 or 104) communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment, the applications 370 may include an application (for example, a health care application of a mobile medical equipment) designated according to a property of the external electronic device (for example, the electronic device 102 or 104). According to an embodiment, the applications 370 may include an application received from an external electronic device (for example, the server 106 or the electronic device 102 or 104). According to an embodiment, the applications 370 may include a preloaded application or a third party application downloadable from a server. The names of components of the programming module 310 according to the embodiment of the present disclosure may vary according to the type of an OS.

According to various embodiments, at least a part of the programming module 310 may be implemented in software, firmware, hardware, or a combination of at least two of them. At least a part of the programming module 310 may be implemented (for example, executed) by the processor (for example, the processor 210). At least a part of the programming module 310 may include, for example, a module, a program, a routine, a set of instructions, or a process to execute one or more functions.

Figure 4:
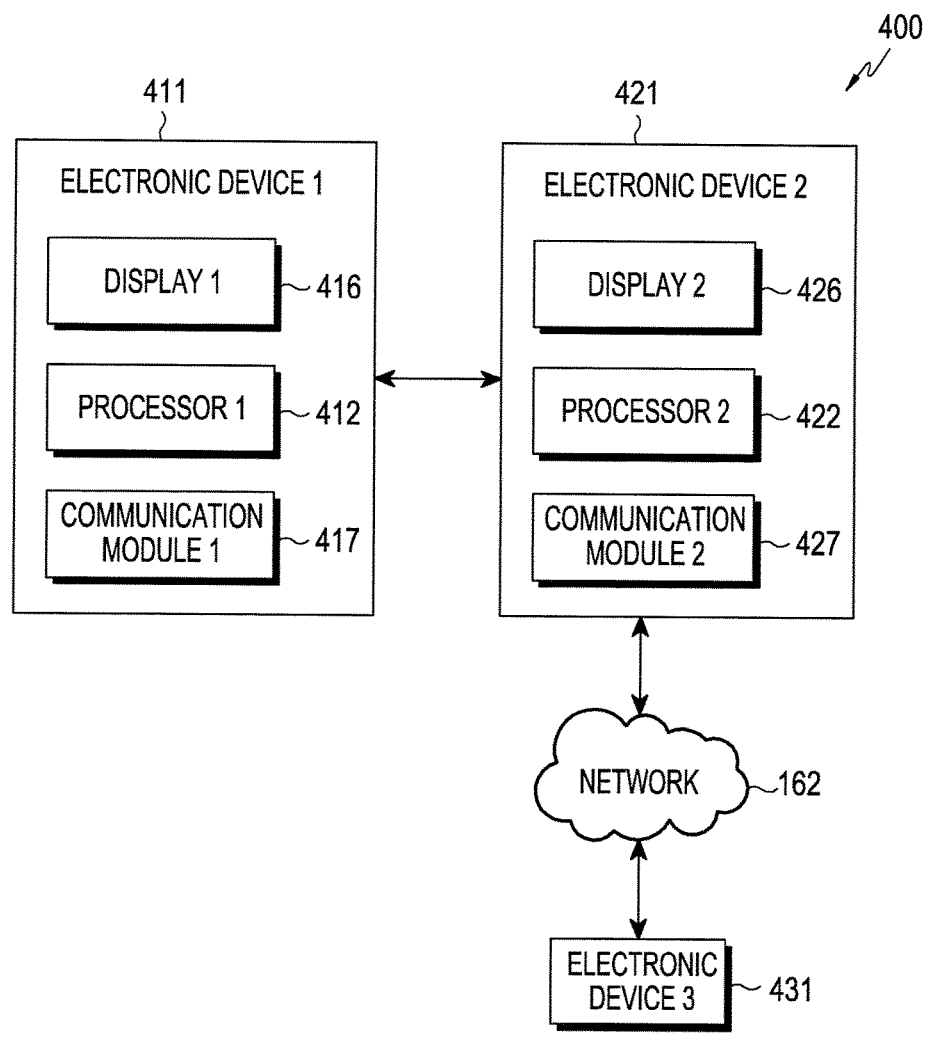
FIG. 4 illustrates a communication system according to various embodiments.

FIG. 4 illustrates a communication system according to various embodiments. A communication system 400 may include a first electronic device 411 (for example, the electronic device 101 or 201), a second electronic device 421 (for example, the electronic device 101 or 201), and a third electronic device 431 (for example, the electronic device 101 or 201).

The first electronic device 411 may include a first display 416 (for example, the display 160 or 260) for displaying a screen, a first communication module 417 (for example, the communication interface 170 or the communication module 220) for transmitting data to or receiving data from an external electronic device, and a first processor 412 (for example, the processor 120 or 210) for executing the functionalities of the first electronic device 411 by controlling the first display 416 and/or the first communication module 417.

The second electronic device 421 may include a second display 426 (for example, the display 160 or 260) for displaying a screen, a second communication module 427 (for example, the communication interface 170 or the communication module 220) for transmitting data to or receiving data from an external electronic device, and a second processor 422 (for example, the processor 120 or 210) for executing the functionalities of the second electronic device 421 by controlling the second display 426 and/or the second communication module 427.

The third electronic device 431 may have the same configuration as or a similar configuration to the first electronic device 411 or the second electronic device 421.

The second processor 422 may display a screen on the second display 426 and transmit first data corresponding to the screen (or first data used to configure a screen, that is, first screen data) to the first electronic device 411 through the second communication module 427.

The first processor 412 may receive the first screen data from the second electronic device 421 through the first communication module 417 and display a first screen part configured based on the first screen data on the first display 416.

The first processor 412 may detect a user input related to the first screen part through an input device (for example, the input device 250) and transmit information about the user input to the second electronic device 421 through the first communication module 417.

The second processor 422 may receive the information about the user input from the first electronic device 411 through the second communication module 427 and perform an operation according to the information about the user input. The second processor 422 may update the screen displayed on the second display 426 by performing the operation and transmit second data corresponding to the updated screen (or second data used to configure a screen, that is, second screen data) to the first electronic device 411 through the second communication module 427.

The first processor 412 may receive the second screen data from the second electronic device 421 through the first communication module 417 and display, on the first display 416, a second screen part configured based on the second screen data.

In an embodiment, the second processor 422 may transmit a message to the third electronic device 431 according to information about a user input received from the first electronic device 411 or a user input applied to a screen displayed on the second display 426.

In an embodiment, the second processor 422 may update the screen displayed on the second display 426 along with the transmission of the message and transmit third data corresponding to the updated screen (or third data used to configure a screen, that is, third screen data) to the first electronic device 411 through the second communication module 427. For example, the first processor 412 may receive the third screen data from the second electronic device 421 through the first communication module 417 and display, on the first display 416, a third screen configured based on the third screen data.

Figure 5:
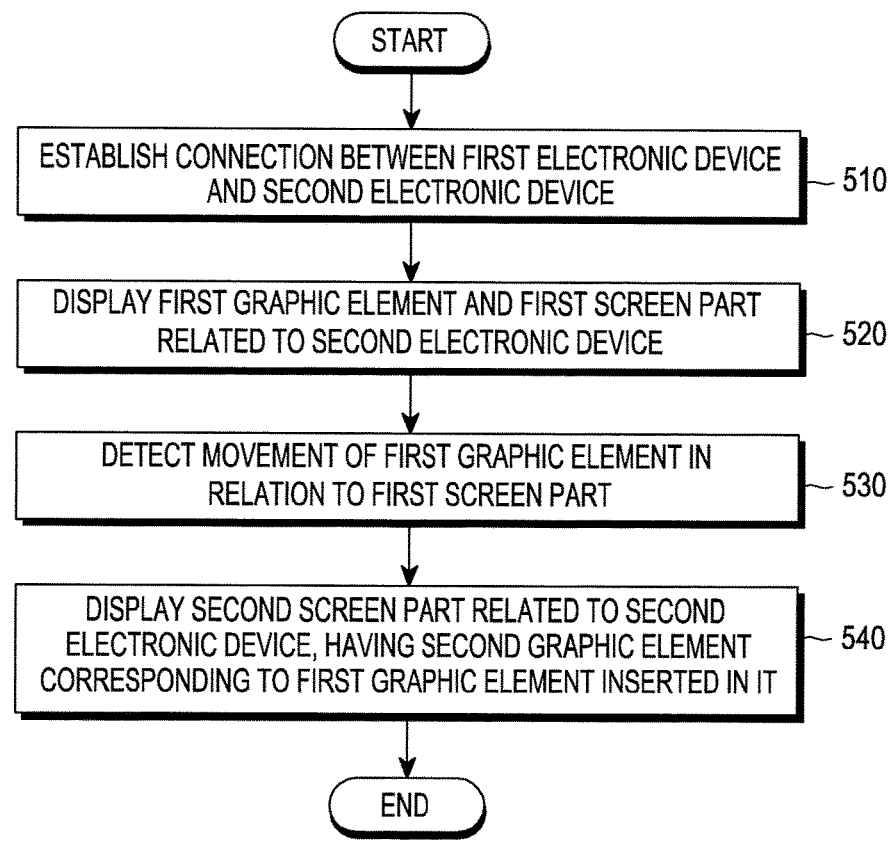
FIG. 5 illustrates a method for operating a first electronic device according to various embodiments.

FIG. 5 illustrates a method for operating a first electronic device according to various embodiments. The method for operating a first electronic device may include operations 510 to 540. The method for operating a first electronic device may be performed by at least one of the first electronic device (for example, the electronic device 101, 201, or 411), a first processor of the first electronic device (for example, the processor 120, 210, or 412), or a first controller of the first electronic device.

Referring to FIG. 5, the first electronic device may establish a wired or wireless communication connection with a second electronic device (for example, the electronic device 101, 201, or 421) in operation 510.

For example, the first electronic device may establish a wired communication connection with the second electronic device through a first communication module (for example, the communication interface 170 or the communication module 220 or 417) supporting USB, HDMI, or the like.

For example, the first electronic device may establish a wireless communication connection with the second electronic device through the first communication module conforming to a wireless communication protocol such as WiFi® (802.11x), WiFi Direct), IrDA, Zigbee®, NFC, radio-frequency identification (RFID), Bluetooth®, or ultra-wideband (UWB).

For example, the wired/wireless communication connection may be triggered by automatic device discovery of each of the first and second electronic devices, a user's connection command for either of the first and second electronic devices, a user's connection between connectors of the first and second electronic devices, or execution of the same applications installed in the first and second electronic devices.

In an embodiment, one of the first and second electronic devices may receive device information (or display information) from the other electronic device.

In an embodiment, the first and second electronic devices may exchange device information (or display information) with each other.

For example, the device information (or display information) may include at least one of the unique ID and model name of an electronic device, and the resolution, aspect ratio, size, video quality, model name, or unique ID of a display.

In operation 520, the first electronic device may display a first graphic element and a first screen part related to the second electronic device.

In an embodiment, the second electronic device may generate screen data to be displayed on a second display (for example, the display 160, 260, or 426), display the screen data on the second display, and transmit the screen data to the first electronic device through a second communication module (for example, the communication interface 170 or the communication module 220 or 427). The first electronic device may convert the screen data received from the second electronic device according to device information about a first display (for example, the display 160, 260, or 416) and display the converted screen data on the first display.

In an embodiment, the second electronic device may convert the screen or screen data displayed on the second display according to display information about the first electronic device and transmit the converted screen data to the first electronic device.

In an embodiment, the second electronic device may generate second screen data to be displayed on the second display and first screen data to be displayed on the first display, and transmit the first screen data to the first electronic device through the second communication module. The first electronic device may display a first screen part configured based on the first screen data on the first display, and the second electronic device may display a second screen part configured based on the second screen data on the second display. The first and second screen parts (or the first and second screen data) may be the same in contents and different in representation formats such as screen sizes, aspect ratios, resolutions, or video quality. That is, the first and second screen data may represent the same item or object.

For example, a screen may refer to a visual image displayed on a display. Screen data may refer to any data with which a screen may be configured. For example, the screen data may be image data, text data, application data, or the like. For example, the screen data may be a raster image or bitmap image of a screen displayed on the display.

In an embodiment, the first screen part may include a screen of an application (that is, an application screen) displayed on the second display. For example, the application screen may be referred to as a graphics user interface (GUI), an application window, an application area, or the like. For example, the application may be an application set to automatic execution in an environment setting, or an application executed automatically upon generation of an event such as message reception, call termination, or an alarm event.

In an embodiment, the first screen part may include at least a part of a whole screen displayed on the second display.

In an embodiment, the first screen part may be a mirrored screen that the first electronic device displays with data displayed on the second display, which is received in real time.

In an embodiment, a graphic element may be at least one of text, an image, a file, an icon, an application screen, a GUI, and/or the like.

In operation 530, the first electronic device may detect movement of the first graphic element in relation to the first screen part.

In an embodiment, the first electronic device may detect a first user input that selects the first graphic element displayed on the first display. The first electronic device may detect a second user input that moves from the position of the selected first graphic element to the position of the first screen part on the first display.

In an embodiment, the first electronic device may detect a second user input that drags the first graphic element to the position of the first screen part on the first display.

In an embodiment, the first electronic device may detect a second user input (for example, a swipe input or a flick input) that moves from the selected first graphic element toward the first screen part on the first display.

In an embodiment, the first electronic device may display, on the first display, at least one graphic element representing at least one application being executed in the second electronic device (or capable of processing data corresponding to the first graphic element) in response to the second user input. The first electronic device may detect a third user input that selects one of the at least one graphic element.

In an embodiment, the first electronic device may detect a third user input that drags the first graphic element to the position of one of the at least one graphic element.

In an embodiment, the first electronic device may detect a first user input that selects the first graphic element displayed on the first display. The first electronic device may display at least one graphic element representing at least one application being executed in the second electronic device (or capable of processing data corresponding to the first graphic element) on the first display in response to the first user input. The first electronic device may detect a third user input that selects one of the at least one graphic element, or drags the first graphic element to the position of one of the at least one graphic element.

In an embodiment, before displaying the at least one graphic element, the first electronic device may receive information about the at least one application from the second electronic device. The information about the at least one application may include at least one of a list of applications (or application IDs) supported by or being executed in the second electronic device, information about the types (for example, image file, text file, and music file)/formats (for example, file extensions) of data that each application of the list may process, and/or the like.

In an embodiment, the electronic device may transmit information about data corresponding to the first graphic element and/or the data to the second electronic device. The second electronic device may transmit information about the at least one application or screen data including the at least one graphic element to the first electronic device in response to the reception of the data.

In operation 540, the first electronic device may display a second screen part related to the second electronic device, in which a second graphic element corresponding to the first graphic element is inserted, in response to movement (or detection of movement) of the first graphic element.

In an embodiment, the first screen part may correspond to a screen of an application being executed (or displayed) in the second electronic device, and the second screen part may correspond to an updated screen of the application, in which the second graphic element corresponding to the data is inserted.

In an embodiment, the first electronic device may transmit data corresponding to the first graphic element to the second electronic device. The first electronic device may receive screen data corresponding to the second screen part from the second electronic device. The first electronic device may display, on the first display, the second screen part configured based on the screen data.

In an embodiment, the second electronic device may generate screen data in which the second graphic element corresponding to the data is inserted as an attached file, an image, text, or the like, display the screen data on the second display, and transmit the screen data to the first electronic device through the second communication module.

In an embodiment, the second electronic device may convert the screen or screen data in which the data displayed on the second display is inserted according to display information about the first electronic device, and transmit the converted screen data to the first electronic device.

In an embodiment, the second screen part may include at least a part of a whole screen displayed on the second display.

In an embodiment, the second screen part may be a mirrored screen which the first electronic device displays with data displayed on the second display, received from the second electronic device in real time.

In an embodiment, the first electronic device may transmit information related to the data (for example, an address corresponding to the data) to the second electronic device. The first electronic device may receive a transmission request for the data from the second electronic device. The first electronic device may transmit the data to the second electronic device in response to the transmission request. The first electronic device may receive data corresponding to the second screen part from the second electronic device. The first electronic device may display the second screen part on the first display. For example, the data transmission request may include the address.

In an embodiment, the first screen part may correspond to a screen of an application being executed in the second electronic device, and the data corresponding to the first graphic element may be inserted in a message or text written by the application (or to be transmitted to a third electronic device through the application). For example, the data may be attached as a file to the message or text written through the application (or to be transmitted to the third electronic device through the application).

FIGS. 6A to 6E illustrate a method for operating an electronic device according to various embodiments.

Figure 6A:
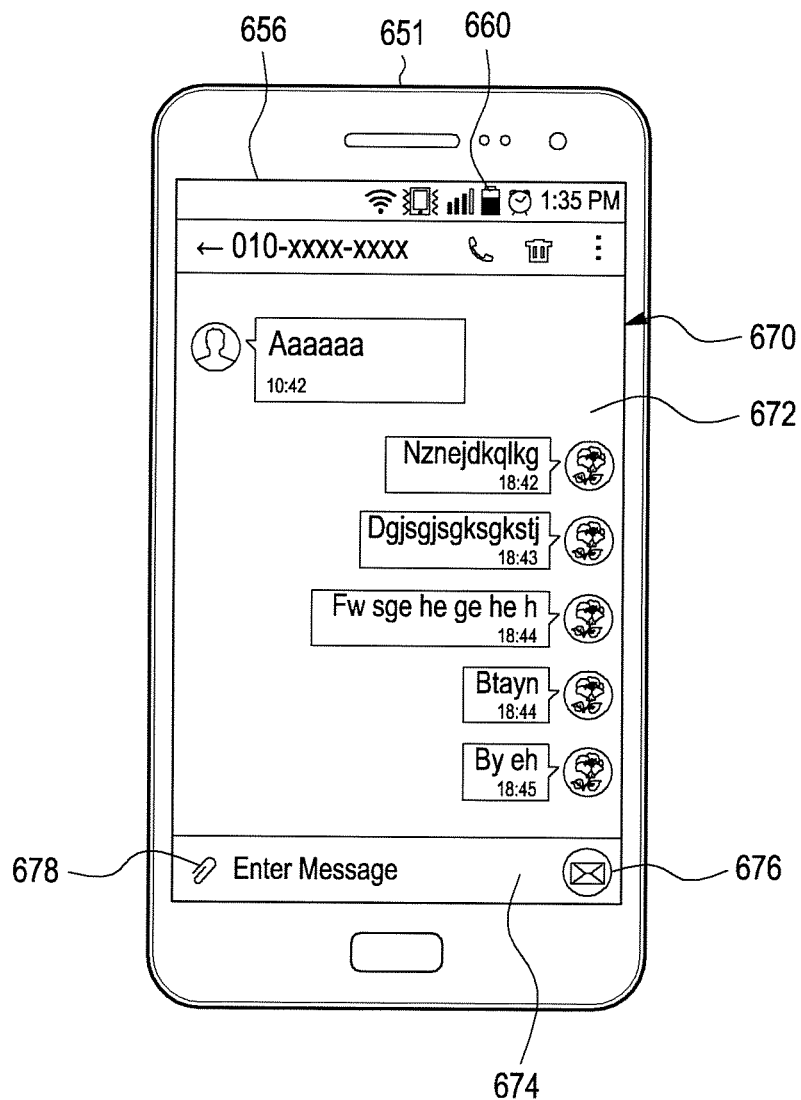
FIGS. 6A to 6E illustrate a method for operating an electronic device according to various embodiments.

Referring to FIG. 6A, a second electronic device 651 (for example, the electronic device 101, 201, or 421) may display a status bar 660 and a first screen 670 of a message application on a second display 656 (for example, the display 160, 260, or 426).

The status bar 660 may be displayed at a top end of the second display 656, and include at least one of a battery charged state indicator, a received signal strength indicator, a current time indicator, and/or the like.

The first screen 670 of the message application may include at least one of a dialogue window 672 for displaying a user message of the second electronic device 651 and a message of the other party received from a third electronic device (for example, the third electronic device 431) communicating with the second electronic device 651, an input window 674 for inputting a message, and a send button 676 for transmitting a message input to the input window 674 to the third electronic device, and an attach button 678 for attaching a file to be transmitted to the third electronic device. Hereinbelow, a window may be referred to as at least one of a window, a user interface (UI), or a GUI.

Figure 6B:
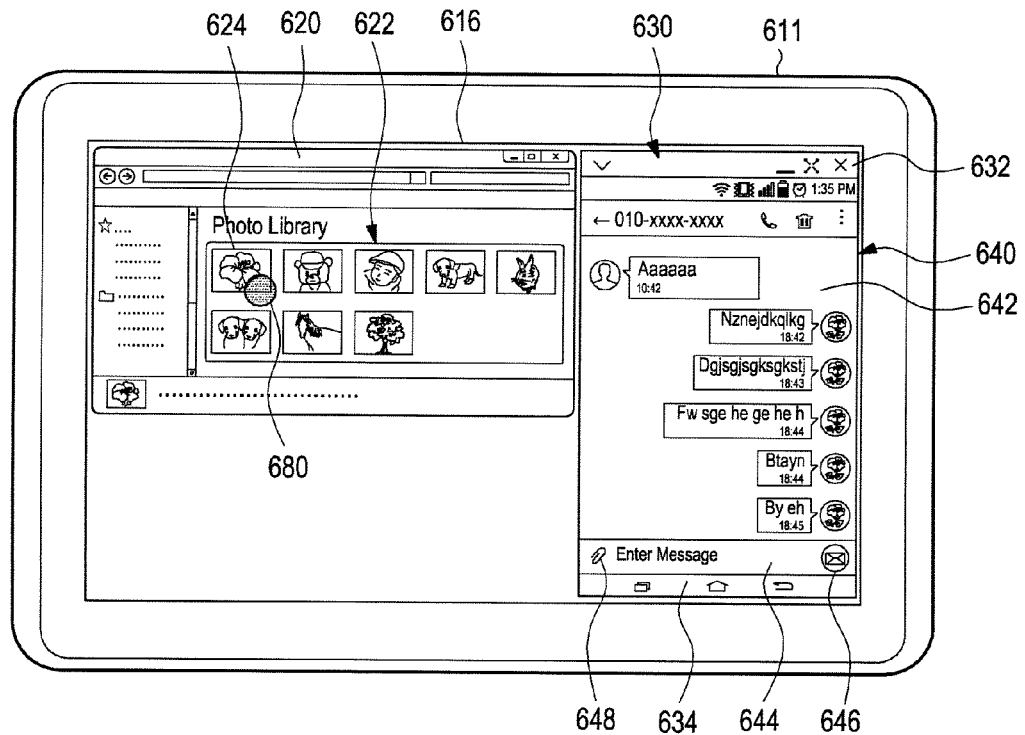

Referring to FIG. 6B, a first electronic device 611 (for example, the electronic device 101, 201, or 411) may display a screen 620 of a file explorer (or a file manager application) and a screen 630 of a mirroring application on a first display 616 (for example, the display 160, 260, or 426).

The screen 620 of the file explorer may include a plurality of graphic elements 622.

The screen 630 of the mirroring application may include a top bar 632 that may be displayed on a top end of the screen 630, a bottom bar 634 that may be displayed on a bottom end of the screen 630, and a first screen part 640 that may be interposed between the top bar 632 and the bottom bar 634.

The top bar 632 may include at least one button for ending, enlarging, and/or contracting the screen 630.

The bottom bar 634 may include a menu button, a home button, and/or a back button corresponding to a menu button, a home button, and/or a back button of the second electronic device 651, respectively.

For example, upon user selection of the home button, the first electronic device 611 may transmit information about the user input (that is, user input information) to the second electronic device 651. The user input information may include information (for example, coordinates) about the position of the user input to the first screen part 640. The second electronic device 651 may display a main home screen on the second display 656 according to the user input information received from the first electronic device 611. The second electronic device 651 may transmit screen data corresponding to the main home screen to the first electronic device 611, and the first electronic device 611 may display a screen part corresponding to the screen data on the first display 616 by replacing the first screen part 640 with the screen.

For example, the home button may be used to display recently used applications or a task manager.

For example, the menu button may be used to display link menus such as a widget add menu, a background screen change menu, a search menu, an edit menu, and an environment setting menu.

For example, the back button may be used to display a screen executed shortly before a currently displayed screen or end the most recently used application.

The first screen part 640 and the first screen 670 of the message application may be the same in terms of contents and different only in terms of representation formats such as screen sizes, aspect ratios, resolutions, and video quality.

The first screen part 640 may include a dialogue window 642, an input window 644, a send button 646, and an attach button 648.

The first electronic device 611 may detect a first user input 680 that selects a first graphic element 624 from among the plurality of graphic elements 622.

For example, the first user input 680 may be applied by touch with a user's finger or an electronic pen or click on a button of a mouse.

Figure 6C:
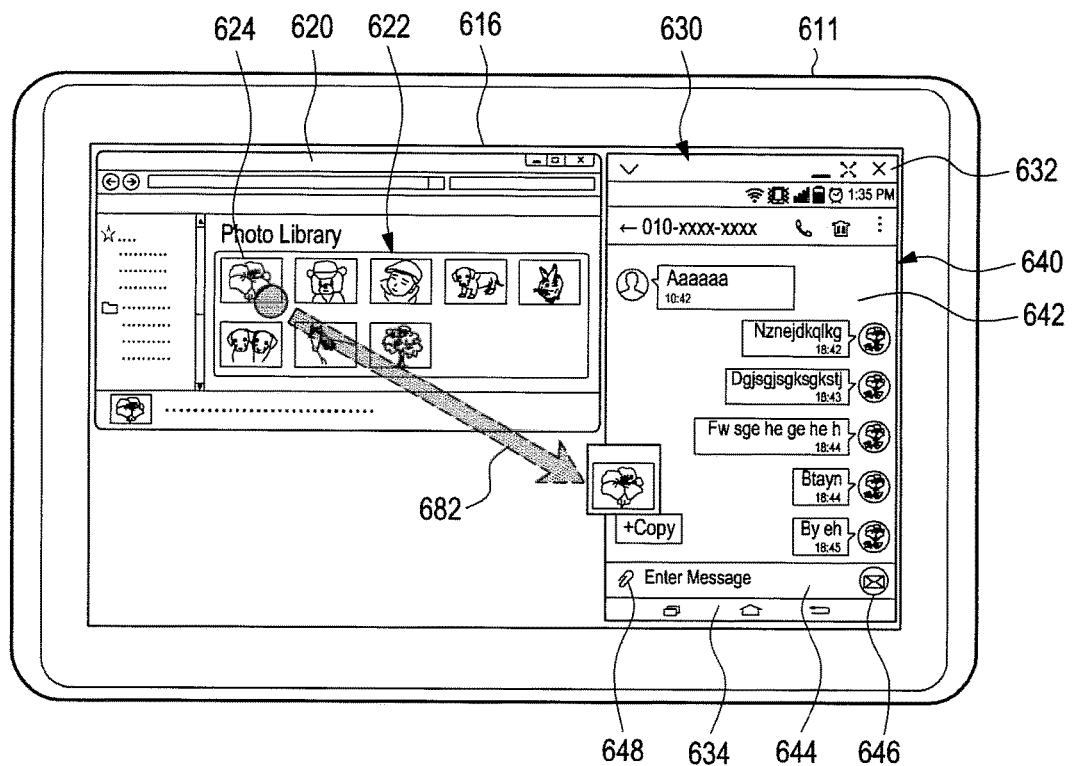

Referring to FIG. 6C, the first electronic device 611 may detect a second user input 682 that drags the first graphic element 624 to the position of the first screen part 640.

In an embodiment, the first electronic device 611 may detect a second user input (for example, a swipe input or a flick input) that moves from the position of the selected first graphic element 624 toward the first screen part 640.

Figure 6D:
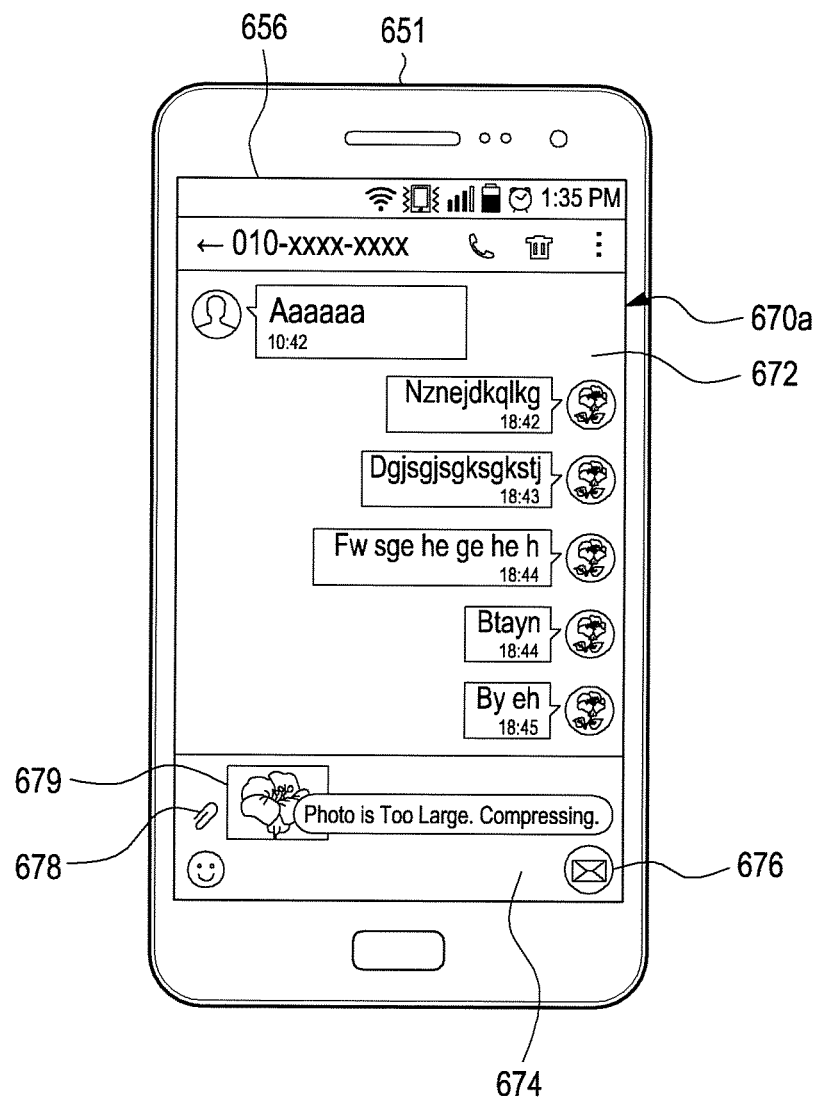

Referring to FIG. 6D, the first electronic device 611 may transmit data (or a file) corresponding to the first graphic element 624 to the second electronic device 651 in response to the movement of the first graphic element 624 (or detection of the movement of the first graphic element 624). The second electronic device 651 may display a second screen 670a of the message application on the second display 656, in which a graphic element 679 corresponding to the data (or file) is inserted in the input window 674. The second electronic device 651 may transmit second screen data corresponding to the second screen 670a to the first electronic device 611.

In an embodiment, the second electronic device 651 may convert the data (or file) corresponding to the first graphic element 624 to a form/format supported by the message application, or compress the data (or file).

Figure 6E:
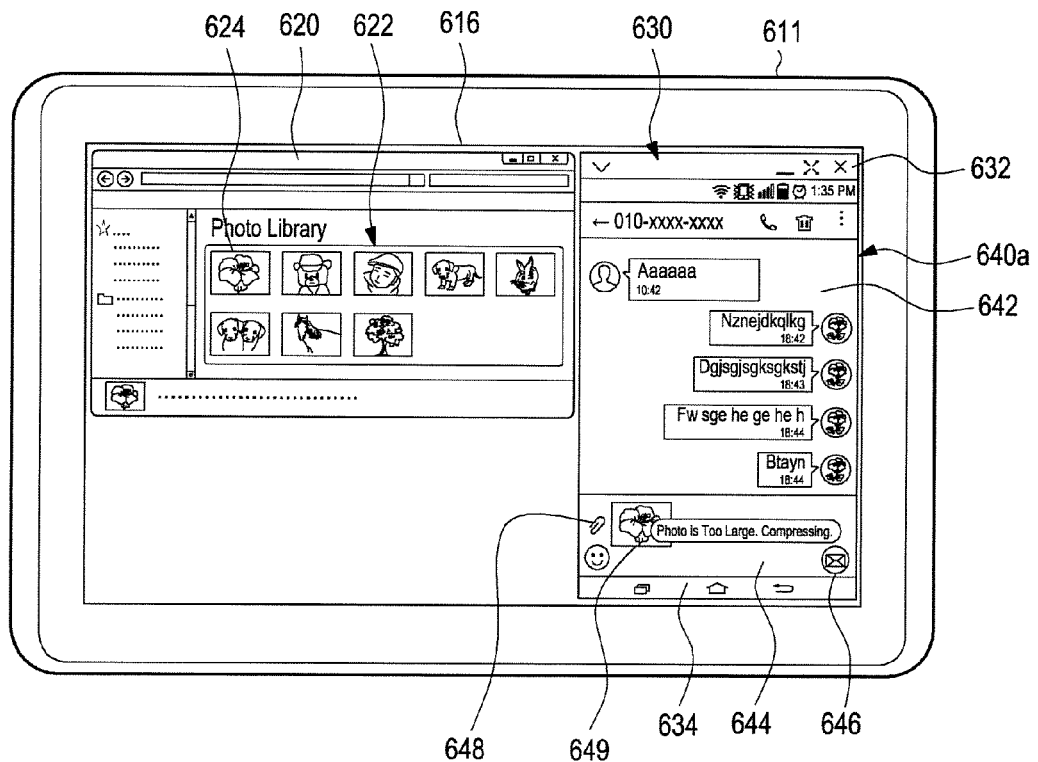

Referring to FIG. 6E, the first electronic device 611 may display a second screen part 640a corresponding to the second screen data by replacing the first screen part 640 with the second screen part 640a on the first display 616.

The second screen part 640a and the second screen 670a of the message application may be the same in term of contents and different in terms of representation formats such as screen sizes, aspect ratios, resolutions, and/or video quality.

The first electronic device 611 may display the second screen part 640a on the first display 616, in which the first graphic element 624 or the second graphic element 649 corresponding to the data (or file) is inserted in the input window 644.

For example, upon detection of selection of the send button 646, the first electronic device 611 may transmit user input information corresponding to the selection to the second electronic device 651, and the second electronic device 651 may transmit a message including the data (or file) corresponding to the first graphic element 624 to the third electronic device through a network (for example, the network 162) according to the user input information.

FIGS. 7A to 7E illustrate a method for operating an electronic device according to various embodiments.

Figure 7A:
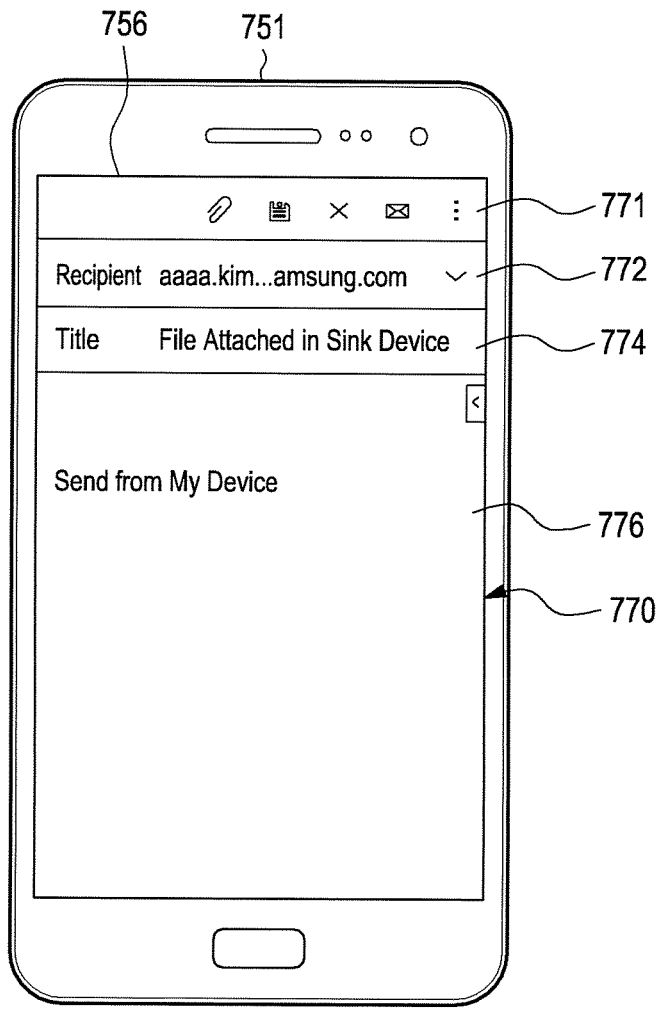
FIGS. 7A to 7E illustrate a method for operating an electronic device according to various embodiments.

Referring to FIG. 7A, a second electronic device 751 (for example, the electronic device 101, 201, or 421) may display a first screen 770 of an email application on a second display 756 (for example, the display 160, 260, or 426).

The first screen 770 of the email application may include at least one of a menu bar 771 with buttons for attaching a file, and saving, deleting, and sending an email, an address input window 772 for inputting an email address of a recipient, a title input window 774 for inputting a title of a mail, and a message input window 776 for inputting the contents of an email (or message).

Figure 7B:
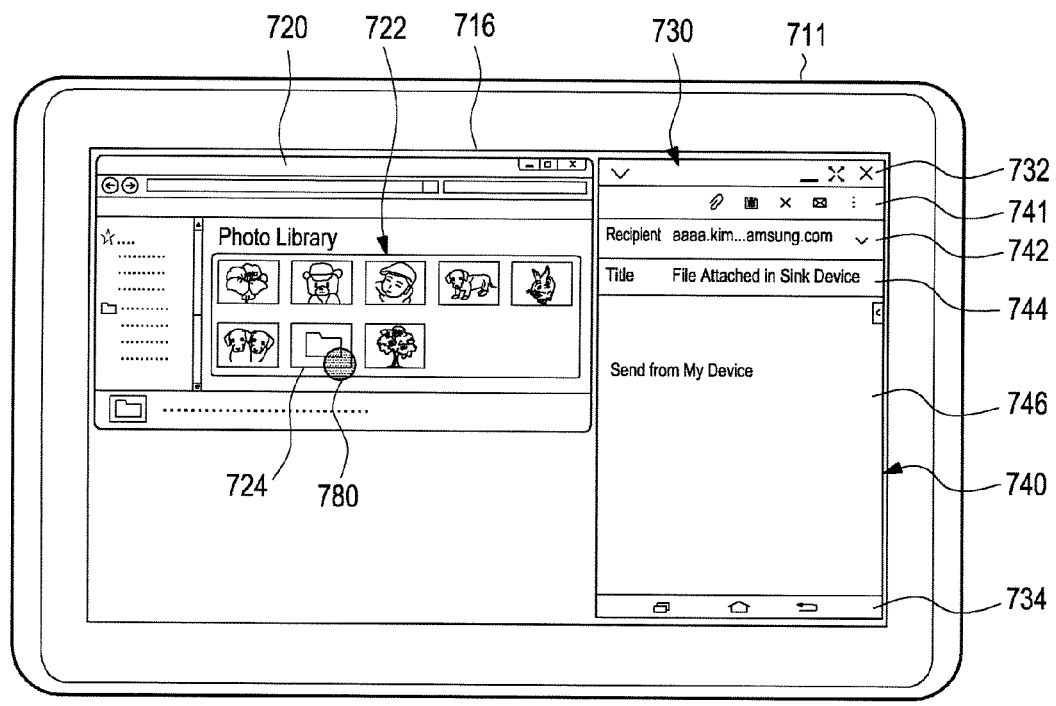

Referring to FIG. 7B, a first electronic device 711 (for example, the electronic device 101, 201, or 411) may display a screen 720 of a file explorer and a screen 730 of a mirroring application on a first display 716 (for example, the display 160, 260, or 426).

The screen 720 of the file explorer may include a plurality of graphic elements 722.

The screen 730 of the mirroring application may include a top bar 732 that may be displayed on a top end of the screen 730, a bottom bar 734 that may be displayed on a bottom end of the screen 730, and a first screen part 740 that may be interposed between the top bar 732 and the bottom bar 734.

The top bar 732 may include at least one button for ending, enlarging, and/or contracting the screen 730.

The bottom bar 734 may include a menu button, a home button, and/or a back button corresponding to a menu button, a home button, and/or a back button of the second electronic device 751, respectively.

The first screen part 740 and the first screen 770 of the message application may be the same in terms of contents and different only in terms of representation formats such as screen sizes, aspect ratios, resolutions, and video quality.

The first screen part 740 may include a menu bar 741, an address input window 742, a title input window 744, and a message input window 746.

The first electronic device 711 may detect a first user input 780 that selects a first graphic element 724 from among the plurality of graphic elements 722.

For example, the first user input 780 may be applied by touch with a user's finger or an electronic pen or click on a button of a mouse.

Figure 7C:
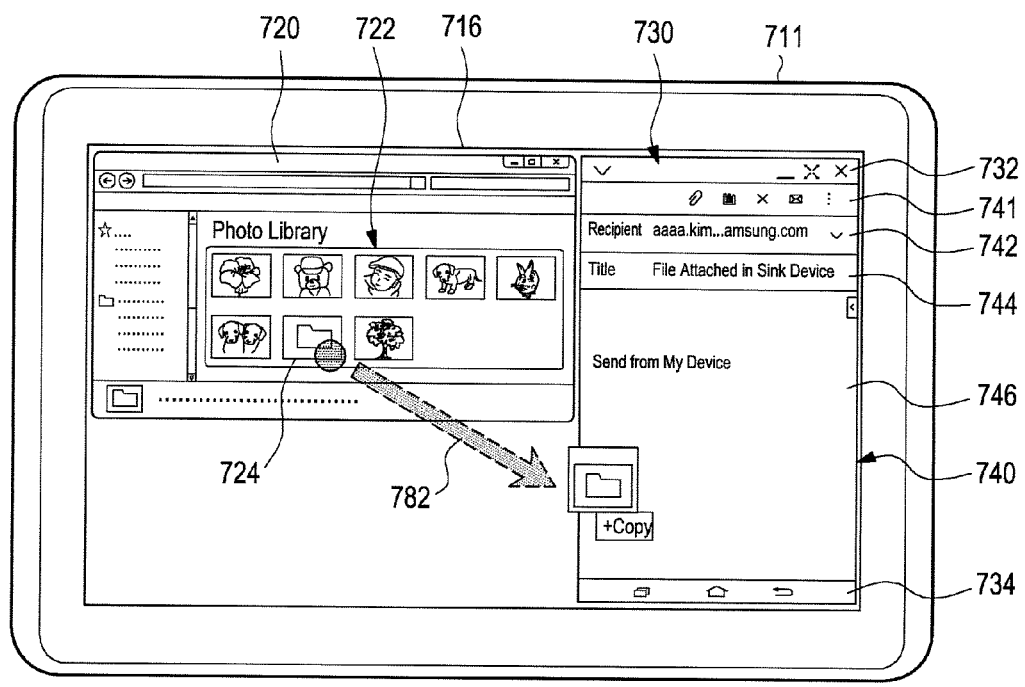

Referring to FIG. 7C, the first electronic device 711 may detect a second user input 782 that drags the first graphic element 724 to the position of the first screen part 740.

In an embodiment, the first electronic device 711 may detect a second user input (for example, a swipe input or a flick input) that moves from the position of the selected first graphic element 724 toward the first screen part 740.

Figure 7D:
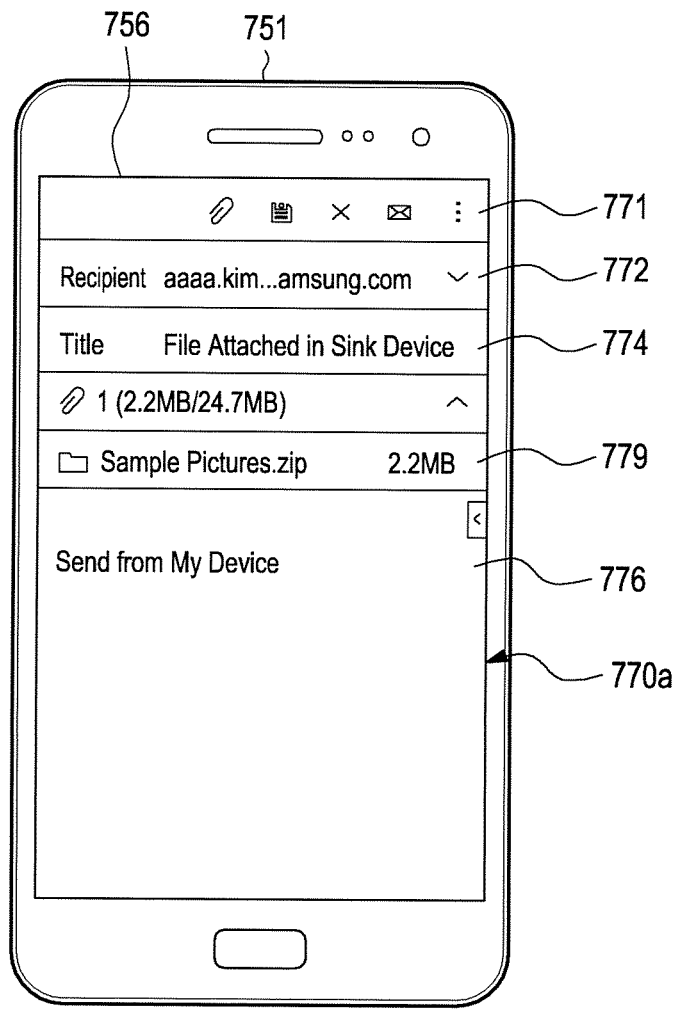

Referring to FIG. 7D, the first electronic device 711 may transmit data (or a file) corresponding to the first graphic element 724 to the second electronic device 751 in response to the movement of the first graphic element 724 (or detection of the movement of the first graphic element 724). The second electronic device 751 may display a second screen 770a of the email application on the second display 756, in which a graphic element 779 corresponding to the data (or file) is inserted as an attached file indicator in the message input window 776. The second electronic device 751 may transmit second screen data corresponding to the second screen 770a to the first electronic device 711.

In an embodiment, the second electronic device 751 may convert the data (or file) corresponding to the first graphic element 724 to a form/format supported by the email application, or compress the data (or file).

Figure 7E:
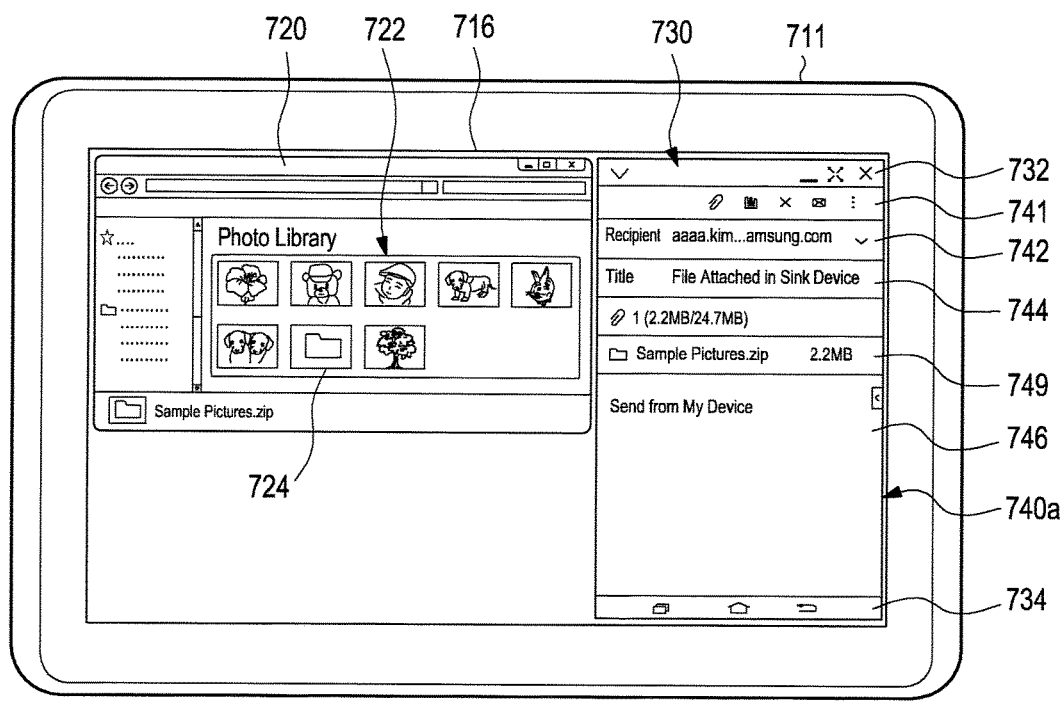

Referring to FIG. 7E, the first electronic device 711 may display a second screen part 740a corresponding to the second screen data by replacing the first screen part 740 with the second screen part 740a on the first display 716.

The second screen part 740a and the second screen 770a of the email application may be the same in term of contents and different in terms of representation formats such as screen sizes, aspect ratios, resolutions, and video quality.

The first electronic device 711 may display the second screen part 740a on the first display 716, in which the first graphic element 724 or the second graphic element 749 corresponding to the data (or file) is inserted as an attached file indicator in the message input window 746.

For example, upon detection of selection of an email send button included in the menu bar 741, the first electronic device 711 may transmit user input information corresponding to the selection to the second electronic device 751, and the second electronic device 751 may transmit an email including the data (or file) corresponding to the first graphic element 624 to a third electronic device through a network (for example, the network 162) according to the user input information.

FIGS. 8A to 8E illustrate a method for operating an electronic device according to various embodiments.

Figure 8A:
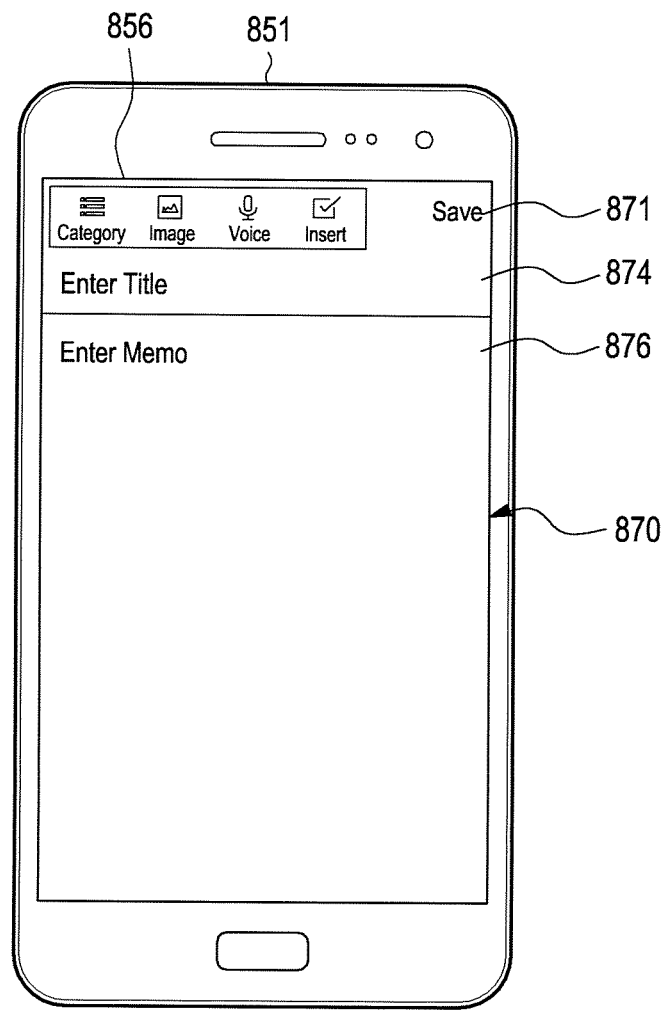
FIGS. 8A to 8E illustrate a method for operating an electronic device according to various embodiments.

Referring to FIG. 8A, a second electronic device 851 (for example, the electronic device 101, 201, or 421) may display a first screen 870 of a memo application on a second display 856 (for example, the display 160, 260, or 426).

The first screen 870 of the memo application may include at least one of a menu bar 871 with buttons for image insertion, voice insertion, and saving, a title input window 874 for inputting a title of a memo, or a message input window 876 for inputting the contents of a memo (or message).

Figure 8B:
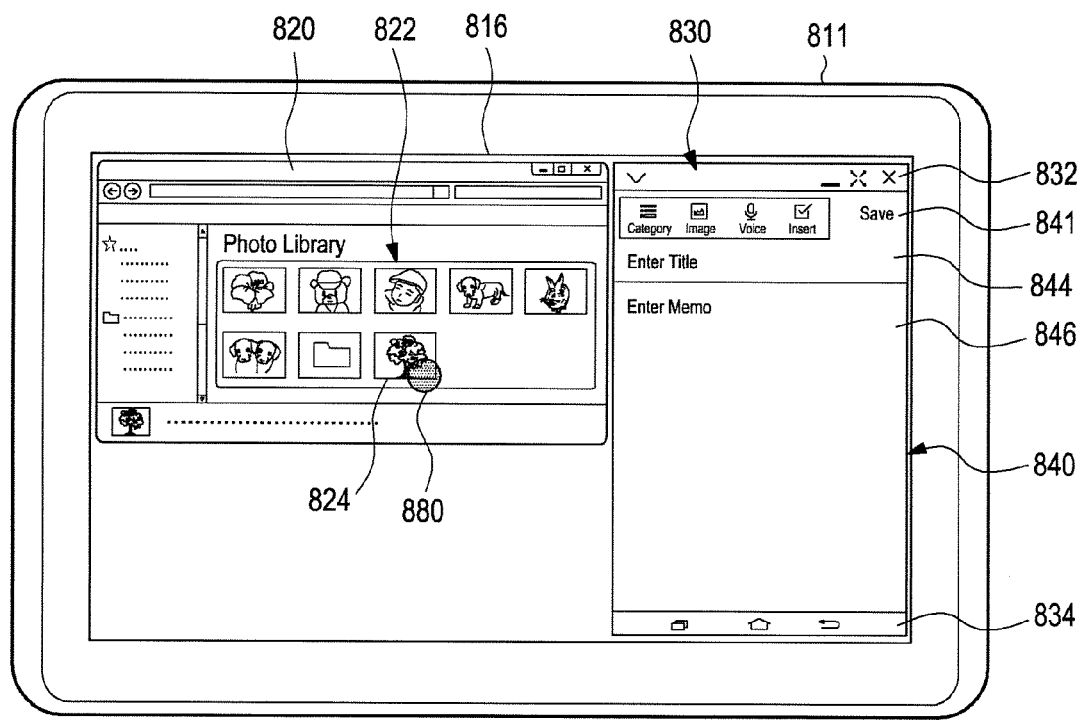

Referring to FIG. 8B, a first electronic device 811 (for example, the electronic device 101, 201, or 411) may display a screen 820 of a file explorer and a screen 830 of a mirroring application on a first display 816 (for example, the display 160, 260, or 426).

The screen 820 of the file explorer may include a plurality of graphic elements 822.

The screen 830 of the mirroring application may include a top bar 832 that may be displayed on a top end of the screen 830, a bottom bar 834 that may be displayed on a bottom end of the screen 830, and a first screen part 840 that may be interposed between the top bar 832 and the bottom bar 834.

The top bar 832 may include at least one button for ending, enlarging, and/or contracting the screen 830.

The bottom bar 834 may include a menu button, a home button, and/or a back button corresponding to a menu button, a home button, and/or a back button of the second electronic device 851, respectively.

The first screen part 840 and the first screen 870 of the memo application may be the same in terms of contents and different only in terms of representation formats such as screen sizes, aspect ratios, resolutions, and video quality.

The first screen part 840 may include a menu bar 841, a title input window 844, and a message input window 846.

The first electronic device 811 may detect a first user input 880 that selects a first graphic element 824 from among the plurality of graphic elements 822.

For example, the first user input 880 may be applied by touch with a user's finger or an electronic pen or click on a button of a mouse.

Figure 8C:
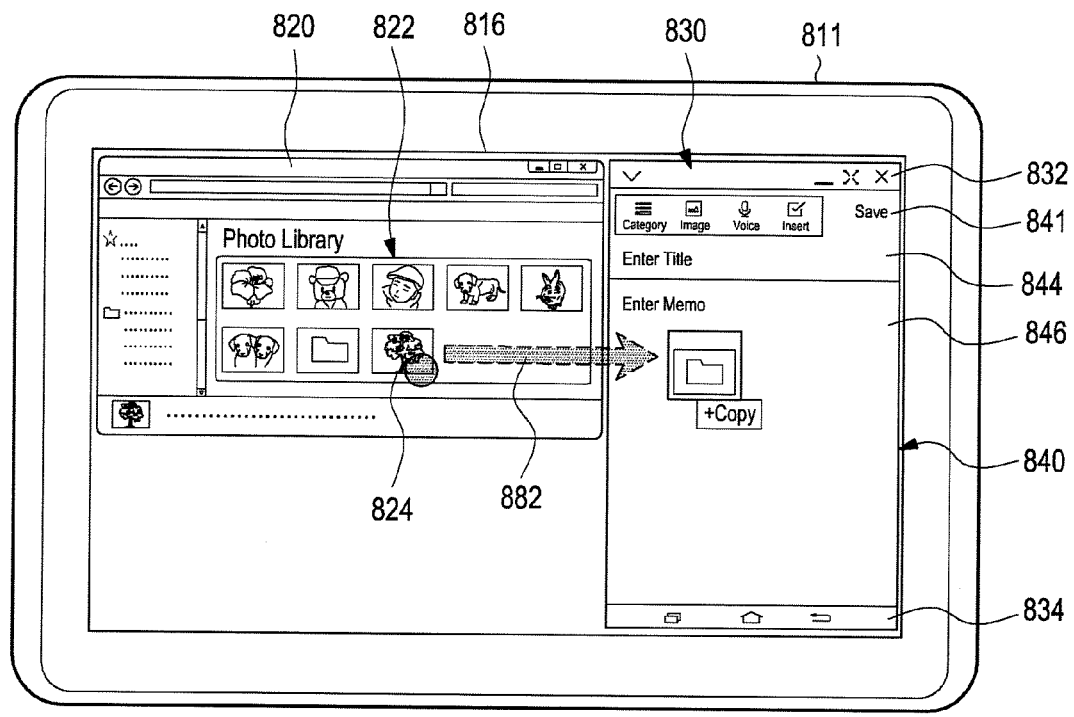

Referring to FIG. 8C, the first electronic device 811 may detect a second user input 882 that drags the first graphic element 824 to the position of the first screen part 840.

In an embodiment, the first electronic device 811 may detect a second user input (for example, a swipe input or a flick input) that moves from the position of the selected first graphic element 824 toward the first screen part 840.

Figure 8D:
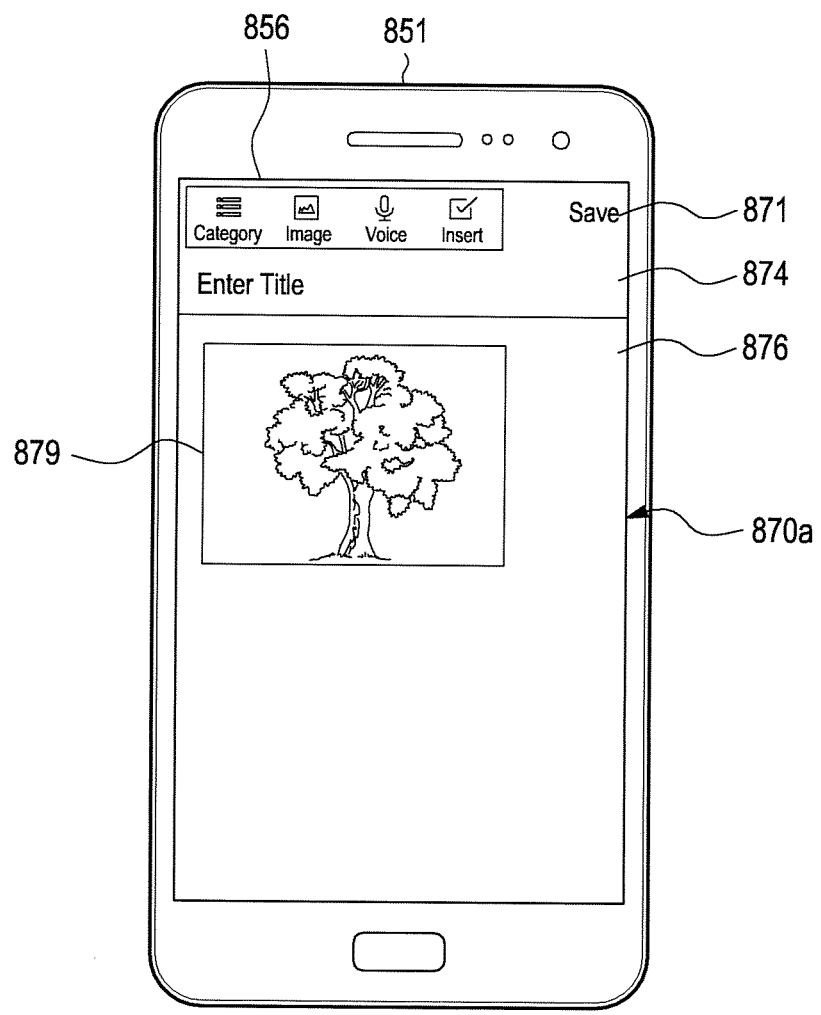

Referring to FIG. 8D, the first electronic device 811 may transmit data (or a file) corresponding to the first graphic element 824 to the second electronic device 851 in response to the movement of the first graphic element 824 (or detection of the movement of the first graphic element 824). The second electronic device 851 may display a second screen 870a of the memo application on the second display 856, in which a graphic element 879 corresponding to the data (or file) is inserted in the message input window 876. The second electronic device 851 may transmit second screen data corresponding to the second screen 870*a* to the first electronic device 811.

In an embodiment, the second electronic device 851 may convert the data (or file) corresponding to the first graphic element 824 to a form/format supported by the memo application, or compress the data (or file).

Figure 8E:
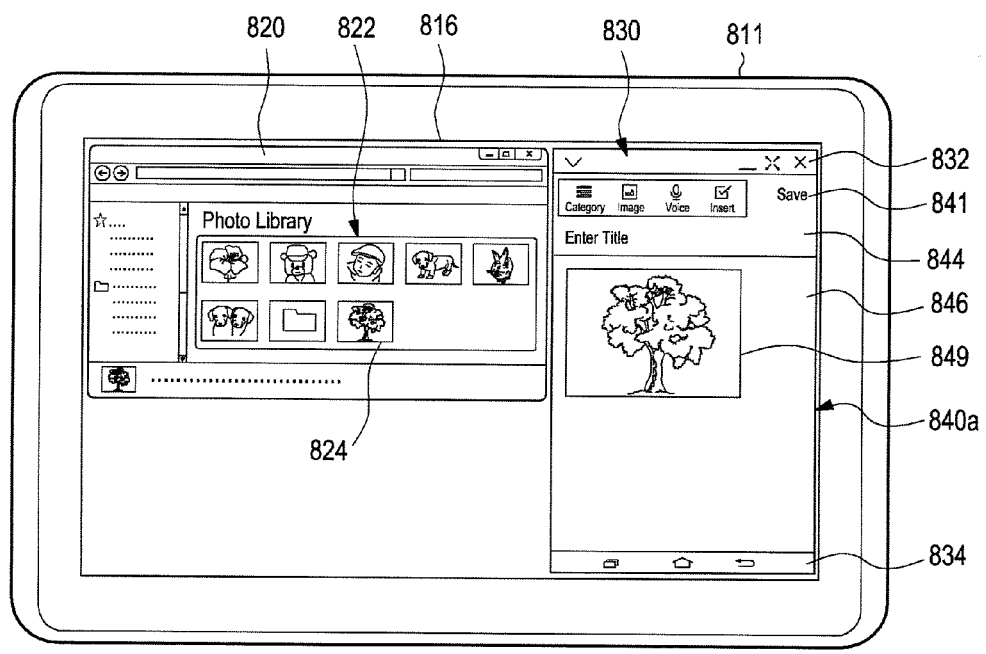

Referring to FIG. 8E, the first electronic device 811 may display a second screen part 840*a* corresponding to the second screen data by replacing the first screen part 840 with the second screen part 840*a* on the first display 816.

The second screen part 840*a* and the second screen 870*a* of the email application may be the same in term of contents and different in terms of representation formats such as screen sizes, aspect ratios, resolutions, and video quality.

The first electronic device 811 may display the second screen part 840*a* on the first display 816, in which the first graphic element 824 or the second graphic element 849 corresponding to the data (or file) is inserted in the message input window 846.

For example, upon detection of selection of a save button included in the menu bar 841, the first electronic device 811 may transmit user input information corresponding to the selection to the second electronic device 851, and the second electronic device 851 may store a memo including the second graphic element 879 or the data (or file) corresponding to the second graphic element 879 in a memory of the second electronic device 851, or display an icon representing the memo on the second display 856.

For example, upon detection of selection of the icon representing the memo, the second electronic device 851 may display a memo including the second graphic element on the second display 856.

Figure 9:
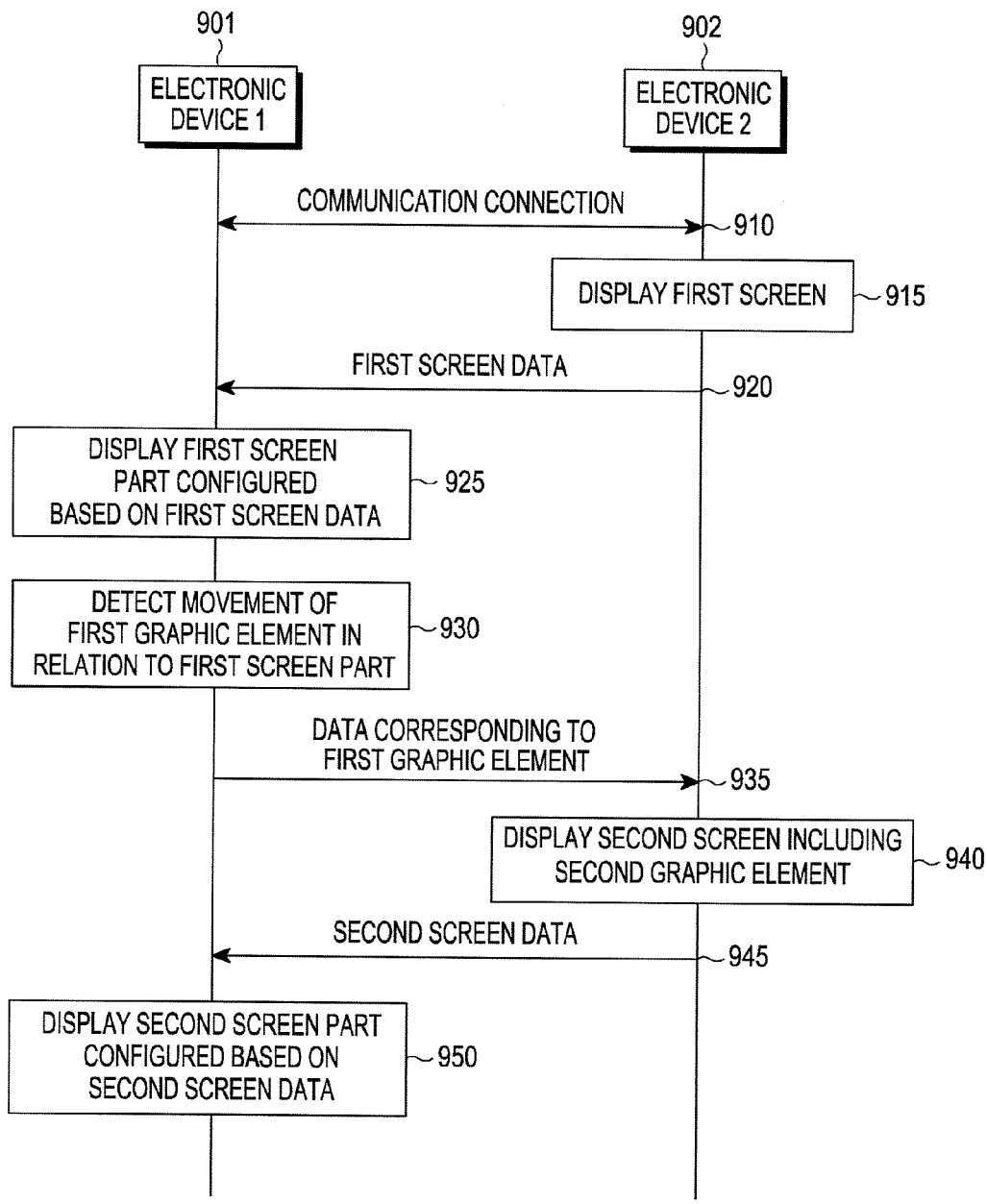
FIG. 9 illustrates a method for operating a first electronic device and a second electronic device according to various embodiments.

FIG. 9 illustrates a method for operating a first electronic device and a second electronic device according to various embodiments. The method for operating a first electronic device and a second electronic device may include operations 910 to 950.

A method for operating a first electronic device 901 (for example, the electronic device 101, 201, or 411) may be performed by at least one of the first electronic device 901, a first processor (for example, the processor 120, 210, or 412) of the first electronic device 901, or a first controller of the first electronic device 901.

A method for operating a second electronic device 902 (for example, the electronic device 101, 201, or 411) may be performed by at least one of the second electronic device 902, a second processor (for example, the processor 120, 210, or 412) of the second electronic device 901, or a second controller of the second electronic device 902.

In operation 910, the first electronic device 901 and the second electronic device 902 may establish a wired or wireless communication connection with each other. The first electronic device 901 may communicate with the second electronic device 902 through a first communication module (for example, the communication interface 170 or the communication module 220 or 417), and the second electronic device 902 may communicate with the first electronic device 901 through a second communication module (for example, the communication interface 170 or the communication module 220 or 427).

In operation 915, the second electronic device 902 may display a first screen on a second display (for example, the display 160, 260, or 426). The first screen may be a screen of an activated application (that is, an application screen). The second electronic device 902 may execute at least one application in addition to a home application (that is, an OS), and display a screen of a user-selected application (for example, a home screen, a message application screen, a memory application screen, or an email application screen). The second electronic device 902 may execute a currently unselected (or inactivated) application in the background.

In operation 920, the second electronic device 902 may transmit first screen data corresponding to the first screen or used to configure the first screen to the first electronic device 901 through the second communication module. The first electronic device 901 may receive the first screen data from the second electronic device 902 through the first communication module.

In operation 925, the first electronic device 901 may display a first graphic element and a first screen part configured based on the first screen data on a first display (for example, the display 160, 260, or 416).

In an embodiment, the first screen part may include at least a part of a whole screen displayed on the second display.

In an embodiment, the first screen part may be a mirrored screen that the first electronic device 901 displays with data (or a screen) displayed on the second display, which is received in real time.

In an embodiment, the first graphic element may be at least one of text, an image, a file, an icon, and/or the like.

In operation 930, the first electronic device 901 may detect movement of the first graphic element in relation to the first screen part.

In an embodiment, the first electronic device 901 may detect a first user input that selects the first graphic element displayed on the first display. The first electronic device 901 may detect a second user input that moves from the position of the selected first graphic element to the position of the first screen part on the first display.

In an embodiment, the first electronic device 901 may detect a second user input that drags the first graphic element to the position of the first screen part on the first display.

In an embodiment, the first electronic device 901 may detect a second user input (for example, a swipe input or a flick input) that moves from the position of the first graphic element toward the first screen part on the first display.

In operation 935, the first electronic device 901 may transmit data (for example, text or a file) corresponding to the second electronic device 902 through the first communication module in response to the movement (or detection of the movement) of the first graphic element.

In operation 940, the second electronic device 902 may display, on the second display, a second screen in which a second graphic element corresponding to the received data (for example, text or file) is inserted. The first screen may correspond to a screen of an activated application (that is, an application screen), and the second screen may correspond to an updated screen of the application, in which the second graphic element is inserted.

In operation 945, the second electronic device 902 may transmit second screen data corresponding to the second screen or used to configure the second screen or a second screen part to the first electronic device 901 through the second communication module. The first electronic device 901 may receive the second screen data from the second electronic device 902 through the first communication module.

In operation 950, the first electronic device 901 may display, on the first display, the second screen part configured based on the second screen data.

In an embodiment, the second screen part may include at least a part of a whole screen displayed on the second display.

In an embodiment, the second screen part may be a mirrored screen that the first electronic device 901 displays with data (or a screen) displayed on the second display, which is received in real time.

Figure 10:
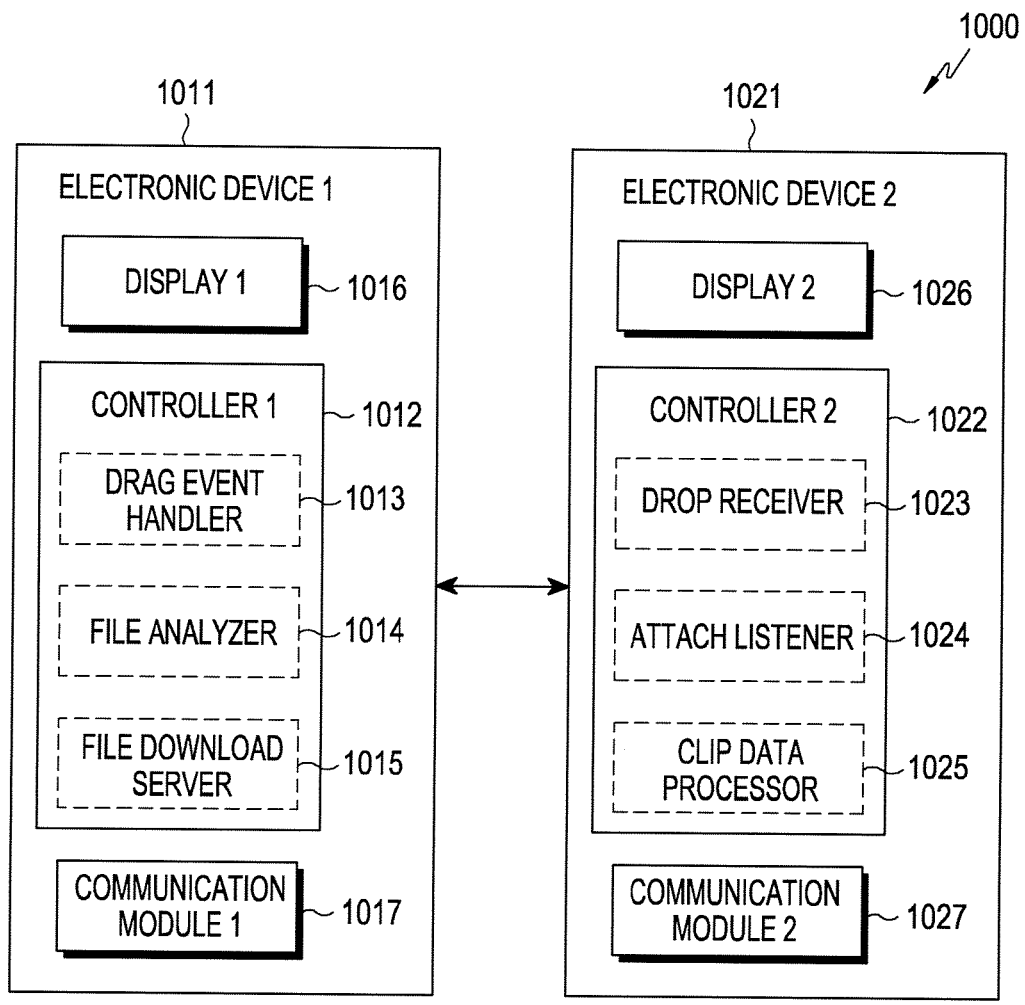
FIG. 10 illustrates a communication system according to various embodiments.

FIG. 10 illustrates a communication system according to various embodiments. A communication system 1000 may include a first electronic device 1011 (for example, the electronic device 101 or 201), and a second electronic device 1021 (for example, the electronic device 101 or 201).

The first electronic device 1011 may include a first display 1016 (for example, the display 160 or 260) for displaying a screen, a first communication module 1017 (for example, the communication interface 170 or the communication module 220) for transmitting data to or receiving data from an external electronic device, and a first controller 1012 (for example, the processor 120 or 210) for executing the functionalities of the first electronic device 1011 by controlling the first display 1016 and/or the first communication module 1017.

The second electronic device 1021 may include a second display 1026 (for example, the display 160 or 260) for displaying a screen, a second communication module 1027 (for example, the communication interface 170 or the communication module 220) for transmitting data to or receiving data from an external electronic device, and a second processor 1022 (for example, the processor 120 or 210) for executing the functionalities of the second electronic device 1021 by controlling the second display 1026 and/or the second communication module 1027.

The first controller 1012 may receive first screen data from the second electronic device 1021 through the first communication module 1017 and display a first screen part configured based on the first screen data, and a first graphic element on the first display 1016.

A drag event handler 1013 of the first controller 1012 may detect a user input that drags the first graphic element to the position of the first screen part on the first display 1016.

A file analyzer 1014 of the first controller 1012 may generate address information about a file corresponding to the first graphic element in response to the detection of the drag input, and transmit/notify/register the address information to a file download server 1015 of the first controller 1012. For example, the address information (for example, a uniform resource locator (URL)) may correspond to the position of the file stored in a first memory (for example, the memory 130 or 230) of the first electronic device 1011.

The file download server 1015 may transmit the address information to the second electronic device 1021 by socket communication using the first communication module 1017.

A drop receiver 1023 of the second controller 1022 may receive the address information through the second communication module 1027. The drop receiver 1023 may transmit a file request message including the address information to the first electronic device 1011 through the second communication module 1027.

The file download server 1015 may transmit the file corresponding to the address information to the second electronic device 1021 by socket communication through the first communication module 1017 in response to the file request message received through the first communication module 1017.

An attach listener 1024 of the second controller 1022 may store the file received through the second communication module 1027 in a second memory (for example, the memory 130 or 230) of the second electronic device 1021. The attach listener 1024 may identify a currently activated application, and transmit/notify information about the application and information about the file to a clip data processor 1025 of the second controller 1022.

The clip data processor 1025 may generate clip data to be attached to or inserted in a message or text written (or to be transmitted to a third electronic device) through the application based on the information about the application and the information about the file.

The second controller 1022 may generate second screen data in which a second graphic element corresponding to the clip data is inserted as an attached file, an image, text, or the like, display the second screen data on the second display, and transmit the second screen data to the first electronic device 1011 through the second communication module 1027.

The first controller 1012 may receive the second screen data from the second electronic device 1021 through the first communication module 1017, and display, on the first display 1016, a second screen part configured based on the second screen data.

Figure 11:
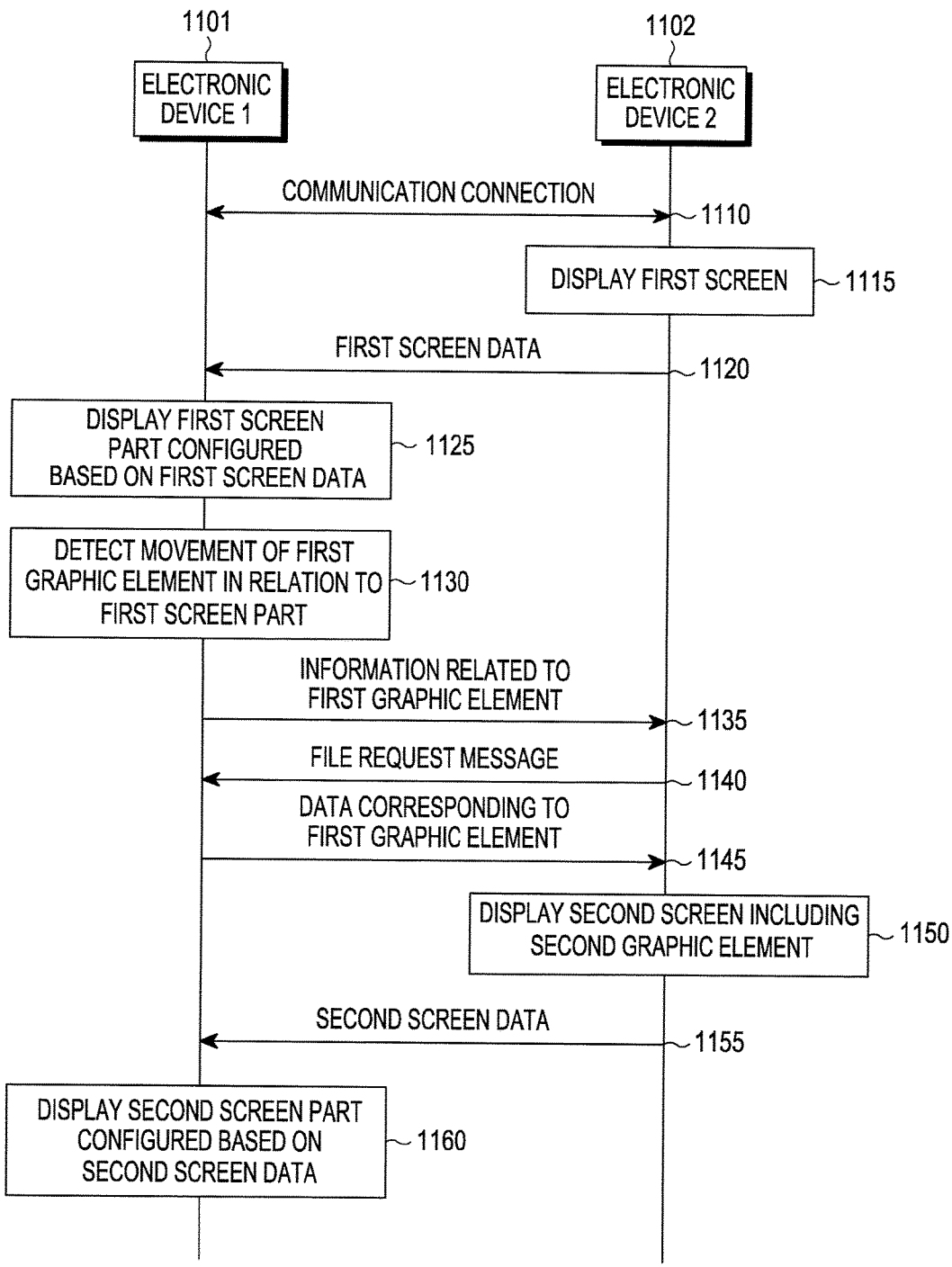
FIG. 11 illustrates a method for operating a first electronic device and a second electronic device according to various embodiments.

FIG. 11 illustrates a method for operating a first electronic device and a second electronic device according to various embodiments. The method for operating a first electronic device and a second electronic device may include operations 1110 to 1160.

A method for operating a first electronic device 1101 (for example, the electronic device 101, 201, or 411) may be performed by at least one of the first electronic device 1101, a first processor (for example, the processor 120, 210, or 412) of the first electronic device 1101, or a first controller (for example, the first controller 1012) of the first electronic device 1101.

A method for operating a second electronic device 1102 (for example, the electronic device 101, 201, or 421) may be performed by at least one of the second electronic device 1012, a second processor (for example, the processor 120, 210, or 422) of the second electronic device 1101, or a second controller (for example, the second controller 1022) of the second electronic device 1102.

In operation 1110, the first electronic device 1101 and the second electronic device 1102 may establish a wired or wireless communication connection with each other. The first electronic device 1101 may communicate with the second electronic device 1102 through a first communication module (for example, the communication interface 170 or the communication module 220 or 417), and the second electronic device 1102 may communicate with the first electronic device 1101 through a second communication module (for example, the communication interface 170 or the communication module 220 or 427).

In operation 1115, the second electronic device 1102 may display a first screen on a second display (for example, the display 160, 260, or 426). The first screen may be a screen of an activated application (that is, an application screen). The second electronic device 1102 may execute at least one application in addition to a home application (that is, an OS), and display a screen of a user-selected application (for example, a home screen, a message application screen, a memory application screen, or an email application screen). The second electronic device 1102 may execute a currently unselected (or inactivated) application in the background.

In operation 1120, the second electronic device 1102 may transmit first screen data corresponding to the first screen or used to configure the first screen or a first screen part to the first electronic device 1101 through the second communication module. The first electronic device 1101 may receive the first screen data from the second electronic device 1102 through the first communication module.

In operation 1125, the first electronic device 1101 may display a first graphic element and a first screen part configured based on the first screen data on a first display (for example, the display 160, 260, or 416).

In an embodiment, the first screen part may include at least a part of a whole screen displayed on the second display.

In an embodiment, the first screen part may be a mirrored screen that the first electronic device 1101 displays with data (or a screen) displayed on the second display, which is received in real time.

In an embodiment, the first graphic element may be at least one of text, an image, a file, an icon, and/or the like.

In operation 1130, the first electronic device 1101 may detect movement of the first graphic element in relation to the first screen part.

In an embodiment, the first electronic device 1101 may detect a first user input that selects the first graphic element displayed on the first display. The first electronic device 1101 may detect a second user input that moves from the position of the selected first graphic element to the position of the first screen part on the first display.

In an embodiment, the first electronic device 1101 may detect a second user input that drags the first graphic element to the position of the first screen part on the first display.

In an embodiment, the first electronic device 1101 may detect a second user input (for example, a swipe input or a flick input) that moves from the position of the first graphic element toward the first screen part on the first display.

In operation 1135, the first electronic device 1101 may transmit information (for example, address information) related to the first graphic element to the second electronic device 1102 through the first communication module.

In operation 1140, the second electronic device 1102 may transmit a file request message including the information related to the first graphic element (for example, the address information) to the first electronic device 1101 through the second communication module 1027.

In operation 1145, the first electronic device 1101 may transmit data (for example, text or a file) corresponding to the first graphic element to the second electronic device 1102 through the first communication module, in response to the file request message.

In operation 1150, the first electronic device 1101 displays, on the second display, a second screen in which a second graphic element corresponding to the received data (for example, the text or file) is inserted. The first screen may correspond to a screen of an activated application (that is, an application screen), and the second screen may correspond to an updated screen of the application, in which the second graphic element is inserted.

In operation 1155, the second electronic device 1102 may transmit second screen data corresponding to the second screen or used to configure the second screen or a second screen part to the first electronic device 1101 through the second communication module. The first electronic device 1101 may receive the second screen data from the second electronic device 1102 through the first communication module.

In operation 1160, the first electronic device 1101 may display, on the first display, a second screen part configured based on the second screen data.

In an embodiment, the second screen part may include at least a part of a whole screen displayed on the second display.

In an embodiment, the second screen part may be a mirrored screen that the first electronic device 1101 displays with data (or a screen) displayed on the second display, which is received in real time.

Figure 12:
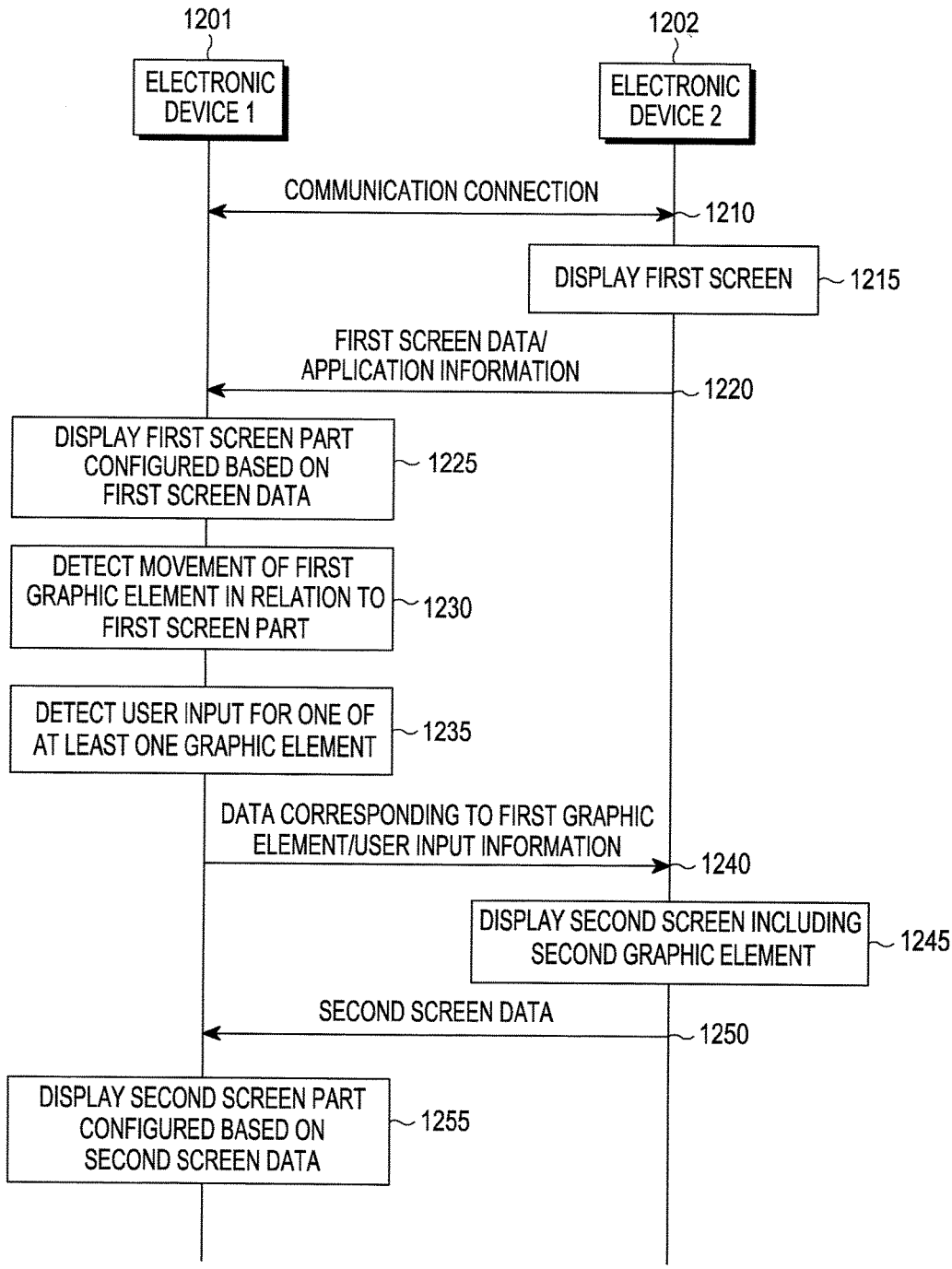
FIG. 12 illustrates a method for operating a first electronic device and a second electronic device according to various embodiments.

FIG. 12 illustrates a method for operating a first electronic device and a second electronic device according to various embodiments. The method for operating a first electronic device and a second electronic device may include operations 1210 to 1255.

A method for operating a first electronic device 1201 (for example, the electronic device 101, 201, or 411) may be performed by at least one of the first electronic device 1201, a first processor (for example, the processor 120, 210, or 412) of the first electronic device 1201, or a first controller (for example, the first controller 1012) of the first electronic device 1201.

A method for operating a second electronic device 1202 (for example, the electronic device 101, 201, or 421) may be performed by at least one of the second electronic device 1012, a second processor (for example, the processor 120, 210, or 422) of the second electronic device 1201, or a second controller (for example, the second controller 1022) of the second electronic device 1202.

In operation 1210, the first electronic device 1201 and the second electronic device 1202 may establish a wired or wireless communication connection with each other. The first electronic device 1201 may communicate with the second electronic device 1202 through a first communication module (for example, the communication interface 170 or the communication module 220 or 417), and the second electronic device 1202 may communicate with the first electronic device 1201 through a second communication module (for example, the communication interface 170 or the communication module 220 or 427).

In operation 1215, the second electronic device 1202 may display a first screen on a second display (for example, the display 160, 260, or 426). The first screen may be a screen of an activated application (that is, an application screen). The second electronic device 1202 may execute at least one application in addition to a home application (that is, an OS), and display a screen of a user-selected application (for example, a home screen, a message application screen, a memory application screen, or an email application screen). The second electronic device 1202 may execute a currently unselected (or inactivated) application in the background.

In operation 1220, the second electronic device 1202 may transmit first screen data corresponding to the first screen or used to configure the first screen or a first screen part to the first electronic device 1201, and application information, separately or simultaneously to the first electronic device 1201 through the second communication module. The application information may include at least one of a list of applications (or application IDs) supported or being executed by the second electronic device 1202, or the types (for example, image file, text file, and music file)/formats (for example, file extensions) of data that may be processed in each application of the list.

The first electronic device 1201 may receive the first screen data and the application information from the second electronic device 1202 through the first communication module.

In operation 1225, the first electronic device 1201 may display a first graphic element and a first screen part configured based on the first screen data on a first display (for example, the display 160, 260, or 416).

In an embodiment, the first screen part may include at least a part of a whole screen displayed on the second display.

In an embodiment, the first screen part may be a mirrored screen that the first electronic device 1201 displays with data (or a screen) displayed on the second display, which is received in real time.

In an embodiment, the first graphic element may be at least one of text, an image, a file, an icon, and/or the like.

In operation 1230, the first electronic device 1201 may detect movement of the first graphic element in relation to the first screen part.

In an embodiment, the first electronic device 1201 may detect a first user input that selects the first graphic element displayed on the first display. The first electronic device 1201 may detect a second user input that moves from the position of the selected first graphic element to the position of the first screen part on the first display.

In an embodiment, the first electronic device 1201 may detect a second user input that drags the first graphic element to the position of the first screen part on the first display.

In an embodiment, the first electronic device 1201 may detect a second user input (for example, a swipe input or a flick input) that moves from the position of the first graphic element toward the first screen part on the first display.

In operation 1235, the first electronic device may display at least one graphic element representing at least one application being executed (or capable of processing data corresponding to the first graphic element) in the second electronic device 1202 on the first display, in response to the movement (or detection of the movement of the first graphic element). The first electronic device 1201 may detect a user input that selects one of the at least one graphic element.

In an embodiment, the first electronic device 1201 may detect a user input that drags the first graphic element to the position of one of the at least one graphic element.

In operation 1240, the first electronic device 1201 may transmit data (for example, text or a file) corresponding to the first graphic element, and/or information (for example, an application ID) about an application corresponding to the selected graphic element to the second electronic device 1202 through the first communication module.

In operation 1245, the first electronic device 1201 displays, on the second display, a second screen in which a second graphic element corresponding to the received data (for example, the text or file) is inserted. The first screen may correspond to a screen of an activated first application (that is, an application screen), and the second screen may correspond to an updated screen of a user-selected second application, in which the second graphic element is inserted.

In operation 1250, the second electronic device 1202 may transmit second screen data corresponding to the second screen or used to configure the second screen or a second screen part to the first electronic device 1201 through the second communication module. The first electronic device 1201 may receive the second screen data from the second electronic device 1202 through the first communication module.

In operation 1255, the first electronic device 1201 may display, on the first display, a second screen part configured based on the second screen data.

In an embodiment, the second screen part may include at least a part of a whole screen displayed on the second display.

In an embodiment, the second screen part may be a mirrored screen that the first electronic device 1201 displays with data (or a screen) displayed on the second display, which is received in real time.

Figure 13A:
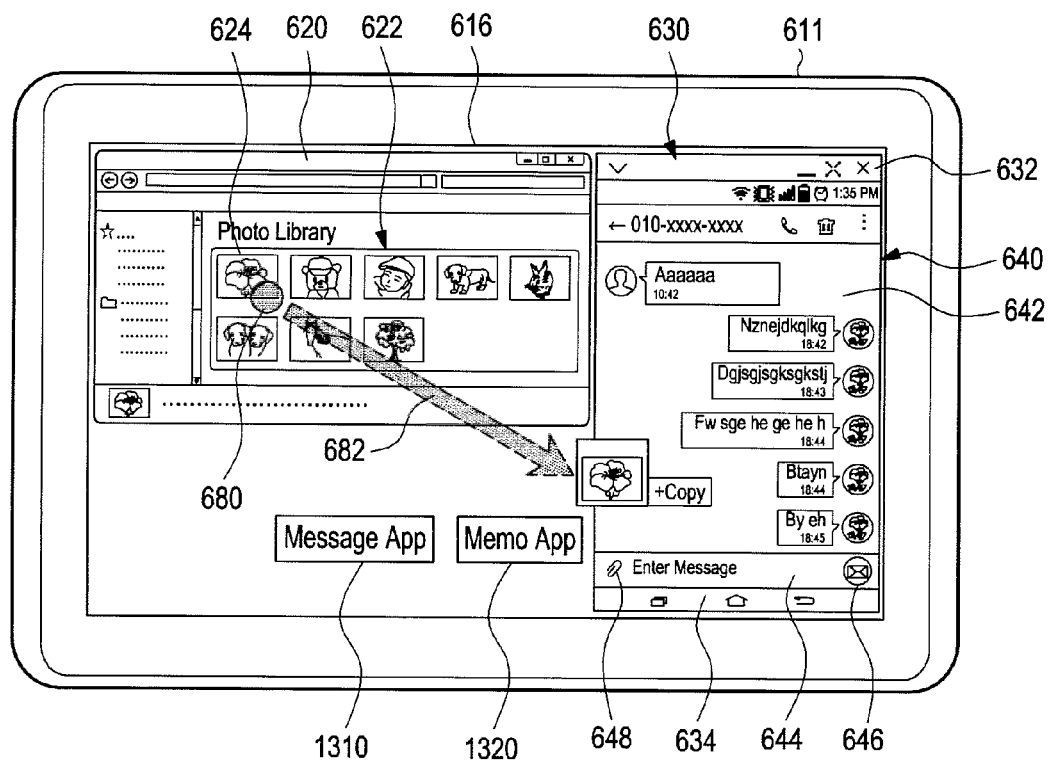
FIGS. 13A and 13B illustrate the method shown in FIG. 12.
Figure 13B:
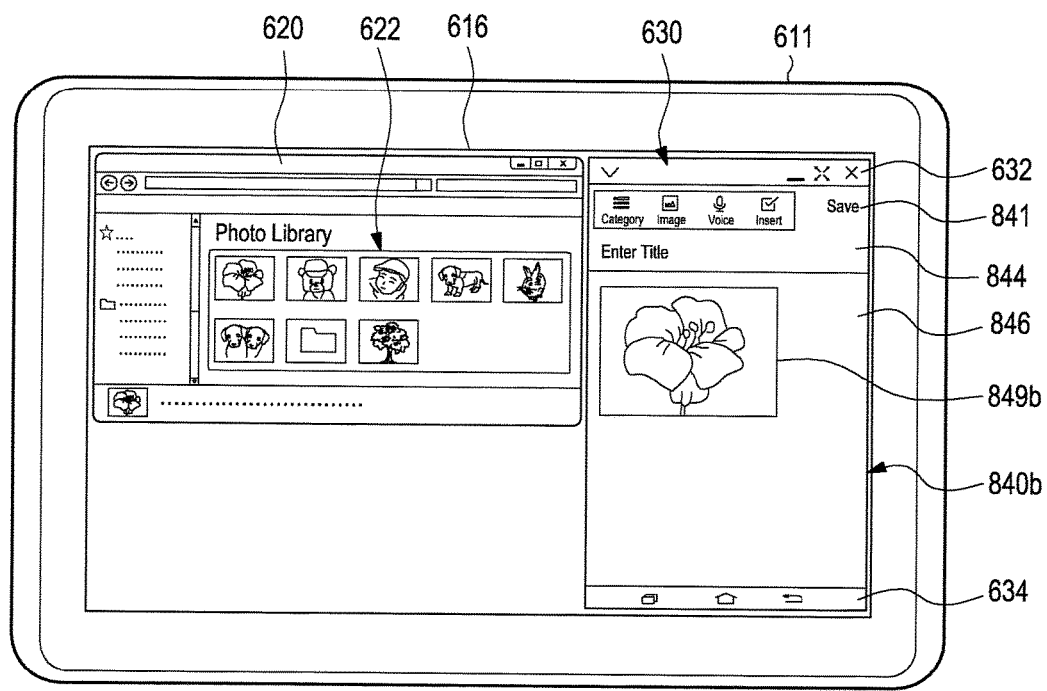

FIGS. 13A and 13B illustrate the method shown in FIG. 12.

As described before with reference to FIGS. 6A, 6B, and 6C, the first electronic device 611 (for example, the electronic device 101, 201, or 411) may display the screen 620 of the file explorer and the screen 630 of the mirroring application on the first display 616 (for example, the display 160, 260, or 426). The first electronic device 611 may detect the first user input 680 that selects the first graphic element 624 from among the plurality of graphic elements 622. The first electronic device 611 may detect the second user input 682 that drags the first graphic element 624 to the position of the first screen part 640.

Referring to FIG. 13A, the first electronic device 611 may display, on the first display 616, one or more graphic elements 1310 and 1320 representing one or more applications being executed (or capable of processing data corresponding to the first graphic element) in the second electronic device 651 in response to the second user input 682.

Upon detection of selection of the graphic element 1310 corresponding to a message application, the first electronic device 611 may display, on the first display 616, the second screen part 640*a* in which the second graphic element 649 representing the data (or file) corresponding to the first graphic element 624 is inserted in the input window 644, as illustrated in FIG. 6E.

Referring to FIG. 13B, upon detection of selection of the graphic element 1320 corresponding to a memo application, the first electronic device 611 may display, on the first display 616, the first graphic element 624 and/or a second screen part 840*b* in which a second graphic element 849*b* corresponding to the data (or file) is inserted in the message input window 846. The second screen part 840*b* may include the menu bar 841, the title input window 844, and the message input window 846.

According to various embodiments, a method for operating a first electronic device may include displaying a first graphic element and a first screen part related to a second electronic device on a first display of the first electronic device, detecting movement of the first graphic element in relation to the first screen part, and displaying a second screen part related to the second electronic device in response to the movement, a second graphic element corresponding to the first graphic element being inserted in the second screen part.

According to various embodiments, the first screen part may include a screen of an application displayed on a second display of the second electronic device.

According to various embodiments, the displaying of the first screen part may include establishing a connection between the first electronic device and the second electronic device, receiving screen data corresponding to the first screen part from the second electronic device, and displaying the first screen part on the first display.

According to various embodiments, data corresponding to the first graphic element may be at least one of text, an image, and/or a file.

According to various embodiments, the first screen part may include at least a part of a whole screen displayed on the second display of the second electronic device.

According to various embodiments, the second screen part may include at least a part of a whole screen displayed on the second display of the second electronic device.

According to various embodiments, the detection of movement of the first graphic element in relation to the first screen part may include detecting a first user input selecting the first graphic element displayed on the first display, and detecting a second user input moving from a position of the first graphic element to a position of the first screen part.

According to various embodiments, the detection of movement of the first graphic element in relation to the first screen part may include detecting a first user input selecting the first graphic element displayed on the first display, and detecting a second user input dragging the first graphic element to the position of the first screen part.

According to various embodiments, the detection of movement of the first graphic element in relation to the first screen part may include detecting a first user input selecting the first graphic element displayed on the first display, detecting a second user input moving from a position of the first graphic element to a position of the first screen part, displaying at least one graphic element representing at least one application being executed in the second electronic device in response to the second user input, and detecting a third user input selecting one of the at least one graphic element.

According to various embodiments, the detection of movement of the first graphic element in relation to the first screen part may include detecting a first user input selecting the first graphic element displayed on the first display, detecting a second user input moving from a position of the first graphic element to a position of the first screen part, displaying at least one graphic element representing at least one application being executed in the second electronic device in response to the second user input, and detecting a third user input dragging the first graphic element to a position of one of the at least one graphic element.

According to various embodiments, the detection of movement of the first graphic element in relation to the first screen part may include detecting a first user input selecting the first graphic element displayed on the first display, displaying at least one graphic element representing at least one application being executed in the second electronic device in response to the first user input, and detecting a third user input dragging the first graphic element to a position of one of the at least one graphic element.

According to various embodiments, the first screen part may correspond to a screen of an application being executed in the second electronic device, and the second screen part may correspond to an updated screen of the application, the second graphic element being inserted in the updated screen.

According to various embodiments, the displaying of a second screen part may include transmitting data corresponding to the first graphic element to the second electronic device, receiving screen data corresponding to the second screen part from the second electronic device, and displaying the second screen part on the first display.

According to various embodiments, the displaying of a second screen part may include transmitting information related to data corresponding to the first graphic element (an address corresponding to the data) to the second electronic device, receiving a request for transmitting the data (including the address) from the second electronic device, transmitting the data to the second electronic device in response to the request, receiving screen data corresponding to the second screen part from the second electronic device, and displaying the second screen part on the first display.

According to various embodiments, the first screen part may correspond to a screen of an application being executed in the second electronic device, and data corresponding to the first graphic element may be inserted in a message or text written (or to be transmitted to a third electronic device) through the application.

According to various embodiments, the first screen part may correspond to a screen of an application being executed in the second electronic device, and data corresponding to the first graphic element may be included as a file in a message or text written (or to be transmitted to a third electronic device) through the application.

According to various embodiments, a method for operating a second electronic device may include displaying a first screen on a second display of the second electronic device, transmitting screen data corresponding to the first screen to a first electronic device, receiving data from the first electronic device, and displaying a second screen in which a second graphic element corresponding to the received data is inserted.

According to various embodiments, the method may further include establishing a connection between the first electronic device and the second electronic device.

According to various embodiments, the method may further include transmitting, to the first electronic device, screen data corresponding to the second screen part in which the received data is inserted.

According to various embodiments, the method may further include transmitting, to the first electronic device, information about at least one application being executed in the second electronic device.

According to various embodiments, the method may further include transmitting, to the first electronic device, information about at least one application being executed in the second electronic device, and the data may be inserted in a message or text written (or to be transmitted to a third electronic device) through one of the at least application.

According to various embodiments, the method may further include transmitting, to the first electronic device, information about at least one application being executed in the second electronic device, and the data may be attached as a file in a message or text written (or to be transmitted to a third electronic device) through one of the at least application.

According to various embodiments, a first electronic device may include a first display, and a processor configured to display a first graphic element and a first screen part related to a second electronic device on the first display, detect movement of the first graphic element in relation to the first screen part, and display a second screen part related to the second electronic device in response to the movement, a second graphic element corresponding to the first graphic element being inserted in the second screen part.

According to various embodiments, the processor may be configured to establish a connection between the first electronic device and the second electronic device, receive screen data corresponding to the first screen part from the second electronic device, and display the first screen part on the first display.

According to various embodiments, the processor may be configured to detect a first user input selecting the first graphic element displayed on the first display, and detect a second user input moving from a position of the first graphic element to a position of the first screen part.

According to various embodiments, the processor may be configured to detect a first user input selecting the first graphic element displayed on the first display, and detect a second user input dragging the first graphic element to the position of the first screen part.

According to various embodiments, the processor may be configured to detect a first user input selecting the first graphic element displayed on the first display, detect a second user input moving from a position of the first graphic element to a position of the first screen part, display at least one graphic element representing at least one application being executed in the second electronic device in response to the second user input, and detect a third user input selecting one of the at least one graphic element.

According to various embodiments, the processor may be configured to detect a first user input selecting the first graphic element displayed on the first display, detect a second user input moving from a position of the first graphic element to a position of the first screen part, display at least one graphic element representing at least one application being executed in the second electronic device in response to the second user input, and detect a third user input dragging the first graphic element to a position of one of the at least one graphic element.

According to various embodiments, the processor may be configured to detect a first user input selecting the first graphic element displayed on the first display, display at least one graphic element representing at least one application being executed in the second electronic device in response to the first user input, and detect a third user input dragging the first graphic element to a position of one of the at least one graphic element.

According to various embodiments, the processor may be configured to transmit data corresponding to the first graphic element to the second electronic device, receive screen data corresponding to the second screen part from the second electronic device, and display the second screen part on the first display.

According to various embodiments, the processor may be configured to transmit information related to data corresponding to the first graphic element (an address corresponding to the data) to the second electronic device, receive a request for transmitting the data (including the address) from the second electronic device, transmit the data to the second electronic device in response to the request, receive screen data corresponding to the second screen part from the second electronic device, and display the second screen part on the first display.

According to various embodiments, a second electronic device may include a second display, and a processor configured to display a first screen on the second display, transmit screen data corresponding to the first screen to a first electronic device, receive data from the first electronic device, and display a second screen in which a second graphic element corresponding to the received data is inserted.

According to various embodiments, the processor may be configured to establish a connection between the first electronic device and the second electronic device.

According to various embodiments, the processor may be configured to transmit, to the first electronic device, screen data corresponding to the second screen part in which the received data is inserted.

According to various embodiments, the processor may be configured to transmit, to the first electronic device, information about at least one application being executed in the second electronic device.

According to various embodiments, the processor may be configured to transmit, to the first electronic device, information about at least one application being executed in the second electronic device, and the data may be inserted in a message or text written (or to be transmitted to a third electronic device) through one of the at least application.

According to various embodiments, the processor may be configured to transmit, to the first electronic device, information about at least one application being executed in the second electronic device, and the data may be attached as a file in a message or text written (or to be transmitted to a third electronic device) through one of the at least application.

As is apparent from the foregoing description of various embodiments, a method for easily reflecting data of an external device in an operation (or application) of a portable phone by mirroring is provided.

The term 'module' as used herein may include its ordinary meaning including, for example, a unit of one, or a combination of two or more of hardware, software, and firmware. The term 'module' may be used interchangeably with terms such as, for example, unit, logic, logical block, component or circuit. A 'module' may be the smallest unit of an integrated part or a portion thereof. A 'module' may be the smallest unit for performing one or more functions, or a portion thereof. A 'module' may be implemented mechanically, or electronically. For example, a 'module' may include at least one of a known, or to-be-developed, application-specific integrated circuit (ASIC) chip, field-programmable gate array (FPGA) or programmable logic device that perform certain operations.

At least a part of apparatuses (for example, modules or their functions) or methods (for example, operations) according to various embodiments may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

The computer-readable medium may include hard disk, floppy disk, magnetic media (for example, magnetic tape), optical media (for example, compact disc read-only memory (CD-ROM)), digital versatile disc (DVD), magneto-optical media (for example, floptical disk), hardware devices (for example, read-only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

According to various embodiments, in a storage medium storing commands, the commands are configured to, when at least one processor executes the commands, control the at least one processor to perform at least one operation. The at least one operation may include displaying a first graphic element and a first screen part related to a second electronic device on a first display of a first electronic device, detecting movement of the first graphic element in relation to the first screen part, and displaying a second screen part related to the second electronic device in response to the movement, a second graphic element corresponding to the first graphic element being inserted in the second screen part.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a first electronic device, the method comprising:
controlling a first display of the first electronic device to display a first graphic element and a first screen part corresponding to a screen of a text writing application being executed in a second electronic device on the first display;
detecting movement of the first graphic element in relation to the first screen part;
controlling the first display to display a second screen part corresponding to the screen of the text writing application being executed in the second electronic device in response to the movement of the first graphic element in relation to the first screen part, wherein the second screen part includes a second graphic element corresponding to the first graphic element; and
when a first button included in the second screen part is selected on the first display, transmitting, to the second electronic device, data related to the second graphic element displayed in the second screen part, wherein the transmission of the data to the second electronic device is configured to cause the second electronic device to transmit the data to a third electronic device.

2. The method of claim 1, wherein displaying the first screen part comprises:
establishing a connection between the first electronic device and the second electronic device;
receiving screen data corresponding to the first screen part from the second electronic device; and
controlling the first display to display the first screen part on the first display.

3. The method of claim 1, wherein detecting movement of the first graphic element in relation to the first screen part comprises:
detecting a first user input selecting the first graphic element displayed on the first display; and
detecting a second user input moving from a position of the first graphic element to a position of the first screen part.

4. The method of claim 1, wherein displaying the second screen part comprises:
transmitting data corresponding to the first graphic element to the second electronic device;
receiving screen data corresponding to the second screen part from the second electronic device; and
controlling the first display to display the second screen part on the first display.

5. The method of claim 1, wherein displaying the second screen part comprises:
transmitting information related to data corresponding to the first graphic element to the second electronic device;
receiving a request for transmitting the data from the second electronic device;
transmitting the data to the second electronic device in response to the request;

receiving screen data corresponding to the second screen part from the second electronic device; and
controlling the first display to display the second screen part on the first display.

6. A non-transitory machine-readable storage medium having recorded thereon instructions that, when executed, are configured to cause a first electronic device to:
control a first display of the first electronic device to display a first graphic element and a first screen part corresponding to a screen of a text writing application being executed in a second electronic device on the first display;
detect movement of the first graphic element in relation to the first screen part;
control the first display to display a second screen part corresponding to the screen of the text writing application being executed in the second electronic device in response to the movement of the first graphic element in relation to the first screen part, wherein the second screen part includes a second graphic element corresponding to the first graphic element; and
when a first button included in the second screen part is selected on the first display, transmit, to the second electronic device, data related to the second graphic element displayed in the second screen part, wherein the transmission of the data to the second electronic device is configured to cause the second electronic device to transmit the data to a third electronic device.

7. The non-transitory machine-readable storage medium of claim 6, wherein the instructions are configured to cause the first electronic device to display the first screen part by:
establishing a connection between the first electronic device and the second electronic device;
receiving screen data corresponding to the first screen part from the second electronic device; and
control the first display to display the first screen part on the first display.

8. The non-transitory machine-readable storage medium of claim 6, wherein the instructions are configured to cause the first electronic device to detect movement of the first graphic element in relation to the first screen part by:
detecting a first user input selecting the first graphic element displayed on the first display; and
detecting a second user input moving from a position of the first graphic element to a position of the first screen part.

9. The non-transitory machine-readable storage medium of claim 6, wherein the instructions are configured to cause the first electronic device to display the second screen part by:
transmitting data corresponding to the first graphic element to the second electronic device;
receiving screen data corresponding to the second screen part from the second electronic device; and
control the first display to display the second screen part on the first display.

10. The non-transitory machine-readable storage medium of claim 6, wherein the instructions are configured to cause the first electronic device to display the second screen part by:
transmitting information related to data corresponding to the first graphic element to the second electronic device;
receiving a request for transmitting the data from the second electronic device;
transmitting the data to the second electronic device in response to the request;

receiving screen data corresponding to the second screen part from the second electronic device; and control the first display to display the second screen part on the first display.

11. A first electronic device comprising:
a first display;
a communication module; and
a processor configured to:
  control the first display to display a first graphic element and a first screen part corresponding to a screen of a text writing application being executed in a second electronic device on the first display,
  detect movement of the first graphic element in relation to the first screen part,
  control the first display to display a second screen part corresponding to the screen of the text writing application being executed in the second electronic device in response to the movement of the first graphic element in relation to the first screen part, wherein the second screen part includes a second graphic element corresponding to the first graphic element, and
  when a first button included in the second screen part is selected on the first display, transmit, via the communication module to the second electronic device, data related to the second graphic element displayed in the second screen part wherein the transmission of the data to the second electronic device is configured to cause the second electronic device to transmit the data to a third electronic device.

12. The first electronic device of claim 11, wherein the processor is configured to:
  establish a connection between the first electronic device and the second electronic device;
  receive screen data corresponding to the first screen part from the second electronic device; and
  control the first display to display the first screen part on the first display.

13. The first electronic device of claim 11, wherein each of the first screen part and the second screen part includes at least a part of a whole screen displayed on a second display of the second electronic device.

14. The first electronic device of claim 11, wherein the processor is configured to:
  detect a first user input selecting the first graphic element displayed on the first display; and
  detect a second user input moving from a position of the first graphic element to a position of the first screen part.

15. The first electronic device of claim 11, wherein the processor is configured to:
  detect a first user input selecting the first graphic element displayed on the first display;
  detect a second user input moving from a position of the first graphic element to a position of the first screen part;
  control the first display to display a graphic element representing the text writing application being executed in the second electronic device in response to the second user input; and
  detect a third user input selecting one of the graphic element.

16. The first electronic device of claim 11, wherein the second screen part corresponds to an updated screen of the text writing application, the second graphic element being inserted in the updated screen.

17. The first electronic device of claim 11, wherein the processor is configured to:
  transmit data corresponding to the first graphic element to the second electronic device;
  receive screen data corresponding to the second screen part from the second electronic device; and
  control the first display to display the second screen part on the first display.

18. The first electronic device of claim 11, wherein the processor is configured to:
  transmit information related to data corresponding to the first graphic element to the second electronic device;
  receive a request for transmitting the data from the second electronic device;
  transmit the data to the second electronic device in response to the request;
  receive screen data corresponding to the second screen part from the second electronic device; and
  control the first display to display the second screen part on the first display.

19. The first electronic device of claim 11, wherein the first screen part corresponds to a screen of an application being executed in the second electronic device and data corresponding to the first graphic element is inserted in a message or text written through the application.

20. The first electronic device of claim 11, wherein the first screen part corresponds to a screen of a first application being executed in the second electronic device and data corresponding to the first graphic element is inserted in a message or text written through a second application.

* * * * *